US005299142A

United States Patent [19]

Brown et al.

[11] Patent Number: 5,299,142

[45] Date of Patent: Mar. 29, 1994

[54] METHOD AND APPARATUS FOR DETERMINING THE FULLNESS OF A WASTE COMPACTOR

[75] Inventors: Ronald L. Brown, Vernon, Ala.; Rick J. Hemingway, Lawrenceville, Ga.

[73] Assignee: Marathon Equipment Company, Vernon, Ala.

[21] Appl. No.: 863,567

[22] Filed: Apr. 6, 1992

[51] Int. Cl.[5] .......... G01N 7/00

[52] U.S. Cl. .......... 364/558; 364/550; 364/551.01; 100/50; 100/99; 100/229 A; 377/16

[58] Field of Search .......... 364/550, 551.01; 100/35, 99, 50, 229 A, 52, 49; 377/16

[56] References Cited

U.S. PATENT DOCUMENTS

| | | | |
|---|---|---|---|
| 3,872,784 | 11/1975 | Kaszuba et al. | 100/45 |
| 4,044,664 | 2/1977 | Budoff | 100/48 |
| 4,068,096 | 4/1978 | Rattenborg et al. | 179/2 A |
| 4,147,893 | 3/1979 | Matson | 179/24 A |
| 4,735,136 | 3/1988 | Lee et al. | 100/52 |
| 4,773,027 | 2/1988 | Neumann | 364/550 |
| 4,781,111 | 9/1988 | Chesnut | 100/99 |
| 4,953,109 | 6/1990 | Burgis | 364/550 |
| 5,016,197 | 2/1991 | Neumann et al. | 364/550 |

OTHER PUBLICATIONS

McClain Industries, Inc. It's Here Oct. 16, 1989.

*Primary Examiner*—Edward R. Cosimano
*Assistant Examiner*—Kamini Shah
*Attorney, Agent, or Firm*—Joseph W. Berenato, III

[57] ABSTRACT

A method of determining the fullness of a compactor having a reciprocating ram and a container includes the steps of setting a target for the number of reciprocations of the ram required to fill the container to a preselected partial fullness. Each reciprocation of the ram is monitored and the total number is summed. The total number of reciprocations is compared to the target number, and the percentage fullness is calculated from those numbers. The percentage fullness is then displayed locally.

31 Claims, 17 Drawing Sheets

METHOD AND APPARATUS FOR DETERMINING THE FULLNESS OF A WASTE COMPACTOR

FIELD OF THE INVENTION

The disclosed invention is directed to a method and apparatus for determining the fullness of a waste compactor and for locally displaying fullness information in order to permit the user to monitor the filling of the compactor. More specifically, the invention is directed to a compactor fullness determining system which utilizes ram reciprocations as the basis for the fullness determination until the output pressure of the hydraulic pump has achieved a predetermined level after which ram pressure is used as the basis for making the fullness determination. Regardless of how the determination is made, the percent fullness is locally displayed to the operator.

BACKGROUND OF THE INVENTION

Industrial waste compactors normally utilize an hydraulically operated ram assembly in combination with a container. The ram is reciprocal for transferring waste from a charge box into the container in which the waste is compressed. The container may be removable from the ram assembly.

The compactor is typically located at a facility remote from the place at which it is to be emptied. There is usually a fee imposed for emptying the container, regardless of the degree to which the container is filled. Economics suggest that the container not be emptied until it has been filled, because to empty a partially filled container will unnecessarily increase costs for the user. These costs include not only the "tipping" fee for emptying the container, but also the cost for transporting the container to the place at which it is to be tipped. Most users of compactors are therefore interested in seeing to it that the container is not emptied until it has achieved a sufficient level of fullness, and so various fullness monitors have been proposed for that purpose.

The compaction of waste by a reciprocating hydraulic ram is a relatively uncontrollable activity on account of numerous factors. When a variable pressure pump is utilized, as in most large compactors, the output pressure is a function of the resistance exerted against the ram as it transfers the waste into the compactor in order to cause compaction. This resistance is not however uniform, and the ram pressure will typically experience a number of pressure excursions throughout the filling sequence. For example, the pressure output is relatively constant when the container is empty, because then the ram is merely pushing the waste into an empty container so that there is essentially no resistance applied. The transferred waste also initially tends to lie upon the floor of the container until the length of the container is filled. Once the floor has been filled, then at some point the column of waste breaks and some is then forced above that which preceded it. This filling and breaking cycle continues to occur as the container becomes filled, with the result that the pressure is elevated before the column breaks and then is reduced as the next column builds. Yet a further factor has to do with the compressibility of the waste, because it is not unusual for drums, pallets, boards, and like material to be deposited in the charging box. These materials will typically resist being compressed or broken until some limit is exceeded, with the result that the pressure before compression or breakage exceeds that after the event. Various other factors have an impact on the pressure which must be applied to the ram, such as the temperature of the hydraulic fluid, the type of material being compacted, and the like. Each of these factors has a somewhat unpredictable impact on the output hydraulic pressure, thereby complicating the task of trying to monitor the fullness of the container.

Various means have been proposed for monitoring the fullness of the container throughout the filling sequence. It has been proposed, for example, to utilize a pressure switch in the hydraulic line to measure the pressure exerted by the waste when the ram is in the extended or waste compacting position. Various devices have also been proposed for use within the container for monitoring fullness, but anything positioned within the container is subject to being damaged or interfered with as the container fills. It has also been proposed to monitor the hydraulic pressure or the motor current of the hydraulic pump during each reciprocation of the ram. Monitoring motor current or hydraulic pressure is not, however, an accurate means of determining fullness when the container is relatively empty, so that the fullness information may be quite inaccurate during the beginning of the filling cycle.

Those skilled in the art will appreciate that there is a need for a compactor fullness determining system which is able to accurately determine container fullness during all phases of the filling process. The system should be able to know when the container has been emptied in order to differentiate between a container which is empty and one which has recently experienced a downward pressure excursion. The disclosed invention meets these criteria, and also provides a local indication of the container fullness so that the operator may monitor the filling process.

OBJECTS AND SUMMARY OF THE INVENTION

The primary object of the disclosed invention is to provide a compactor fullness determining system which utilizes ram reciprocations during an initial phase of the filling process and ram hydraulic pressure during a subsequent phase of the filling process as a basis for determining the percent fullness of the container.

An additional object of the disclosed invention is to provide a fullness determining system for a compactor which is able to identify when the container has been emptied.

Yet another object of the disclosed invention is to provide a compactor fullness determining system which provides the operator with a local indication of the percent to which the compactor has been filled.

A method of determining the fullness of a compactor having a reciprocating ram in a container comprises the steps of setting a target for the number of reciprocations of the ram required for the hydraulic pressure to achieve a predetermined value; each reciprocation of the ram is monitored and the total number of reciprocations is summed; the hydraulic pressure during a reciprocation is compared with the predetermined value and the percentage fullness of the container is calculated based upon the number of reciprocations and the target if the hydraulic pressure has not achieved the predetermined value; and, the percentage fullness of the container is displayed locally.

A method of determining the fullness of a compactor having a reciprocating hydraulic ram and a container comprises the steps of establishing a first target based upon the number of reciprocations of the ram required for the hydraulic pressure to achieve a predetermined value, and a second target based upon the hydraulic pressure which must be applied to the ram to cause reciprocation thereof so that the container is filled; each reciprocation of the ram is determined and the total number of reciprocations is summed and the hydraulic pressure applied to the ram in order to cause each reciprocation is monitored; the percentage fullness of the container is calculated based upon the total number of reciprocations and the first target in the event the predetermined value has not been achieved and the percentage fullness is calculated based upon the monitored hydraulic pressure and the second target in the event the predetermined value has at least been achieved; and the percentage fullness of the container is displayed.

A method of determining when a compactor having an hydraulic ram and a container has been emptied comprises the steps of establishing an hydraulic pressure indicative of the container having achieved a preselected degree of fullness; the hydraulic pressure required to cause reciprocation of the ram is monitored; an indication is made when the monitored hydraulic pressure establishes that the preselected fullness of the container has been achieved; and an indication is made that the container has been emptied after the indication has been made that the preselected fullness has been achieved and the monitored hydraulic pressure for a preselected number of reciprocations thereafter is substantially less than the hydraulic pressure required to cause the indication that the preselected degree of fullness has been achieved.

A method of monitoring the operation of a plurality of compactors, each compactor having a reciprocating ram and a container and means for monitoring the fullness of the container, comprises the steps of determining the percentage fullness of each container by counting the number of reciprocations of the associated ram and monitoring the hydraulic pressure applied to the ram during each reciprocation; the percentage fullness of the container is locally indicated upon the completion of each reciprocation; and, the percentage fullness and a unique identifier for the associated compactor are transmitted to a remote receiving station.

A fullness determining system comprises a compactor including a reciprocal ram and an operably associated container into which material is transferred by the ram for compaction therein thereby. A variable pressure drive means is operably associated with the ram for causing reciprocation thereof. A display is operably associated with the compactor for displaying the percentage fullness of the container. A monitor means is operably associated with the drive means for determining the percentage fullness of the container. The monitor means includes first means for determining the completion of a reciprocation by the ram, second means for monitoring the output of the drive means, third means for counting the reciprocations of the ram in response to the first means, fourth means for initially calculating the percentage fullness of the container based upon the value of the third means until a predetermined value has been achieved by the second means and for thereafter calculating the percentage fullness of the container based upon the value of the second means, and fifth means operably associated with the display for causing the calculated percentage fullness to be displayed.

These and other objects and advantages of the invention will be readily apparent in view of the following description and drawings of the above described invention.

DESCRIPTION OF THE DRAWINGS

The above and other objects and advantages and novel features of the present invention will become apparent in the following detailed description of the preferred embodiment of the invention illustrated in the accompanying drawings, wherein.

DETAILED DESCRIPTION OF THE INVENTION

Figure 1:
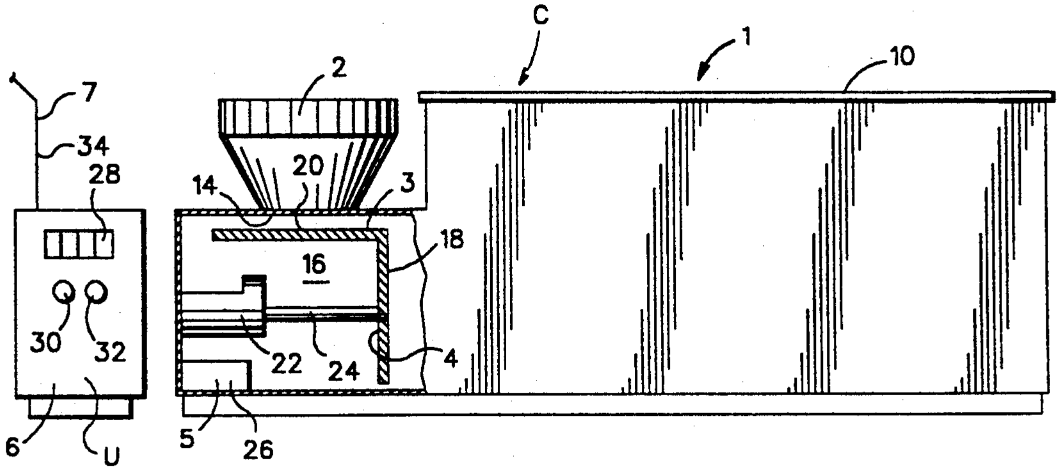
FIG. 1 is a schematic view, partially in section, of a compactor according to the invention having an empty container.

Compactor C, as best shown in FIG. 1, includes an empty container 10 adjacent charging box 12 into which waste may be placed. Charging box 12 has an opening 14 communicating with receiving chamber 16 in which ram 18 is positioned. Ram 18 preferably has a top plate 20 which selectively blocks opening 14, and thereby acts as a value for the receiving chamber 16. Hydraulic cylinder 22 has a reciprocal piston 24 operably connected to ram 18 for causing reciprocation of the ram 18 within chamber 16. Hydraulic power source 26, which preferably includes a variable pressure motor, is operably connected to cylinder 22 for supplying pressurized hydraulic fluid thereto and for causing reciprocation of the piston 24 and thereby of the ram 18. As those skilled in the art understand, reciprocation of ram 18 causes waste material within charging box 12 to be deposited into the receiving chamber 16 and then into the container 10. Filling of the charging box 12 and reciprocation of the ram 18 continue throughout a filling sequence, until the waste within the container 10 achieves a desired degree of compaction.

Control unit U is, preferably, adjacent the compactor C and may, in fact, be integral with the compactor C as is known to those skilled in the art. Control unit U contains the electronic controls for the fullness determining system of the invention as will be further explained. Control unit U has a four digit LED display 28 for displaying alphanumeric information to the user or operator about the status of the compactor C and the fullness determining system, and also the percent fullness of container 10. Control unit U may also have start button 30 and emergency stop button 32 in order to permit the user to control operation of the compactor C. Telephone line 34 may extend from the control unit U in order to provide information to a remote receiving station about the status of the compactor C. The remote telecommunications capability is optional, and we merely require that the display 28 provide a local indication to the user about the status of the compactor C and its fullness. Telephone line 34 may be used, for example, when a single user, such as a retail chain, has numerous compactors C and wishes to have a central dispatch station for maintenance and emptying of them.

Figure 2:
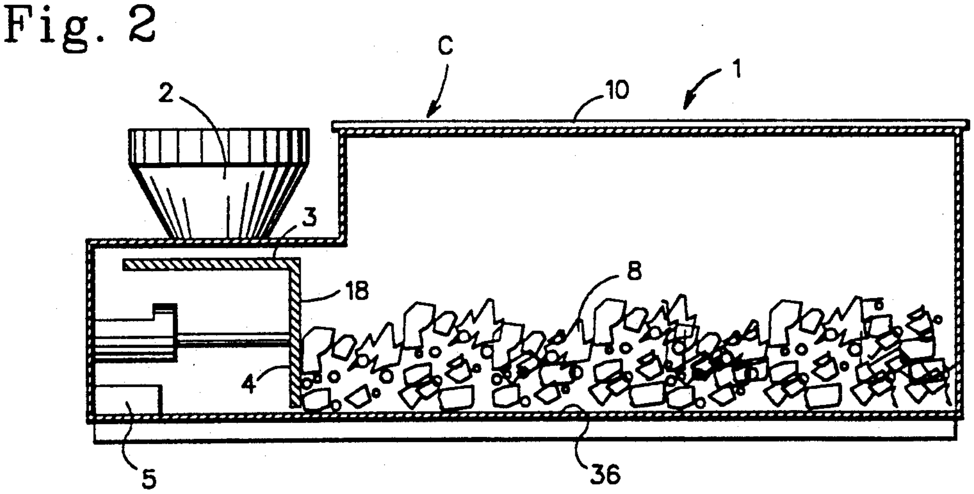
FIG. 2 is a schematic view of the compactor of FIG. 1 with the container partially filled with waste.
Figure 2A:
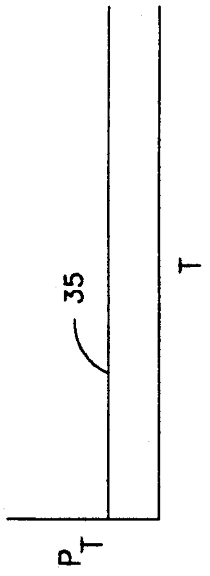
FIG. 2A is a graph of pressure versus time for one extension of the ram with the compactors of FIGS. 1 and 2.

Compactor C in FIG. 2 has been partially filled with waste W by reciprocation of the ram 18. It can be noted in FIG. 2 that the waste W essentially lies along the floor 36 of the container 10. The waste W in FIG. 2 has a height within the container 10 not substantially exceeding the height of the ram 18. This is because the waste, when initially transferred into an empty container 10, tends to spread over the floor 36 of the container because there is no force causing the waste W to accumulate upon itself. Because the container 10 is essentially empty during the initial filling process, then the pressure exerted by the variable output pump of hydraulic source 26 has an essentially flat or constant output throughout both the extension and retraction phase of the reciprocation cycle, as best shown in FIG. 2A at 35. This flat curve occurs because there is essentially little or no resistance to transfer of the waste from the receiving chamber 16 into the container 10, so that the hydraulic pressure is essentially only that required to displace the ram 18 against the weight of the waste W within the receiving chamber 16. The baseline pressure typically is on the order of 300 psi.

Figure 3:
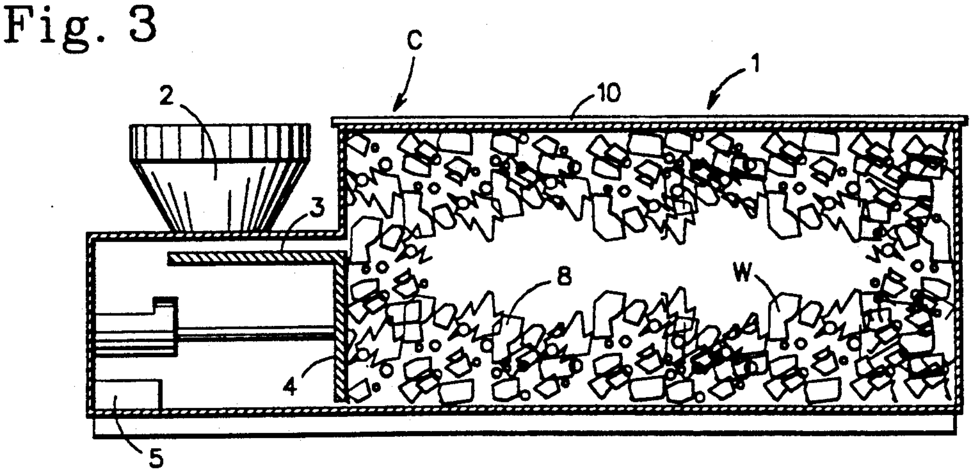
FIG. 3 is a schematic view of the compactor of FIG. 1 with the container at least 50% filled by volume with waste.

Waste container 10 in FIG. 3, on the other hand, has received a sufficient accumulation of waste W so that there is a resistance to transfer of waste from the receiving chamber 16 into the container 10. As earlier noted, the filling process to achieve the orientation of FIG. 3 typically involves a number of beam building and breaking cycles, with breakage of a beam causing the waste nearest the ram 18 to be forced over and upon that waste which is furthest from the ram 18. This building and breaking procedure is essentially uncontrollable, and various factors, which are likewise uncontrollable, impact this process. For example, a pallet may need to be broken, a drum or similar article may need to be crushed, or the waste may simply be bulky, such as when cardboard boxes have been deposited. Repeated reciprocation of the ram 18, however, eventually causes the container 10 to become sufficiently filled with waste W so that the pressure exerted by the pressure source 26 eventually becomes a relatively accurate indicator of the degree to which the container 10 has been filled.

Figure 3A:
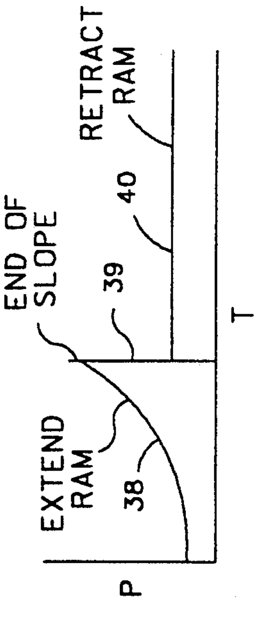
FIG. 3A is a graph of pressure versus time for one cycle of the compactor ram of FIG. 3.

FIG. 3A illustrates the pressure applied by source 26 to ram 18 during one cycle or reciprocation of the ram 18 after adequate waste W has filled the container 10. It can be seen in FIG. 3A that the pressure has a first phase 38 during which the output pressure builds to some maximum, typically achieved at the maximum point of extension of piston 24. The phase 38, as those skilled in the art will understand, is idealized, because the actual pressure curve may exhibit a number of upward and downward pressure excursions during the extension phase as waste is compacted, articles broken, and the like. Upon the ram 18 reaching the maximum extension, then the pressure drops rapidly at 39 because the solenoid control value of the hydraulic source 26 shifts the hydraulic pressure to the opposite side of the cylinder 22 in order to cause the ram 18 to be retracted so that the process can be repeated. During the retraction phase, there is essentially little or no resistance to withdrawal of the ram 18, so that the pressure curve has a flat phase 40 at essentially the pressure of phase 35 of FIG. 2A. Those skilled in the art will appreciate that the ram 18 does not extend into the container 10, so that there is usually nothing within the receiving chamber 16 to impede retraction of the ram. Also, those skilled in the art will appreciate that the transition from the curve of FIG. 2A to that of FIG. 3A occurs somewhat gradually as filling proceeds or other resistance causing events arise.

We have found that the pressure curve begins to be more reliably indicative of the fullness of the container 10 upon the output of pressure source 26 being at least 30% of its maximum output pressure. The maximum output pressure typically is 1,200 to 2,600 psi or more, depending upon the compactor. In order to provide a margin of safety, however, we believe that the pressure curve can truly be relied upon as an indicator of fullness when the pressure output of source 26 is 50% of the maximum pressure which can be applied by source 26. Use of the 50% maximum pressure as the target minimizes any discrepancies which might occur during the initial phase of when the pressure curve is beginning to become indicative of fullness.

Figure 5:
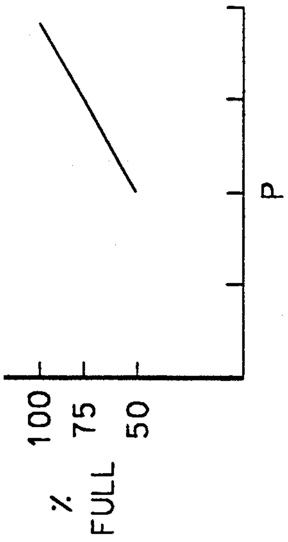
FIG. 5 is a graph of pressure versus percentage fullness pursuant to the invention.
Figure 5A:
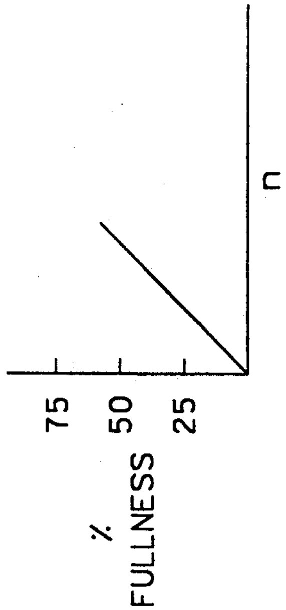
FIG. 5A is a graph of percent fullness versus ram cycles according to the invention.
Figure 4:
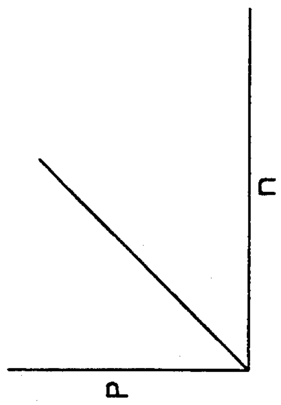
FIG. 4 is a graph of pressure versus number of ram cycles for an idealized compactor.

FIG. 4 illustrates an idealized graph of pressure versus total ram reciprocations. FIG. 4 assumes that the pressure applied to the ram 18 increases at a constant rate based upon the number of reciprocations. As noted, we have found that the real world experience with compactors, such as the compactor C, is that the pressure versus reciprocations curve is very much distorted if reciprocations alone are the determinative factor. Utilization of ram reciprocations for indicating fullness is a relatively valid approximation until the pressure curve becomes more representative. For this reason, we utilize both ram reciprocations and pressure for making the fullness determination as the container 10 is filled by reciprocations of the ram 18. FIG. 5A illustrates the percentage fullness as a function of ram reciprocations, while FIG. 5 is a graph illustrating percentage fullness as a function of pressure. We combine the best features of FIGS. 5 and 5A throughout the filling process in order to provide a fullness determination which is a more accurate determination than may be made using either process alone.

Figure 6:
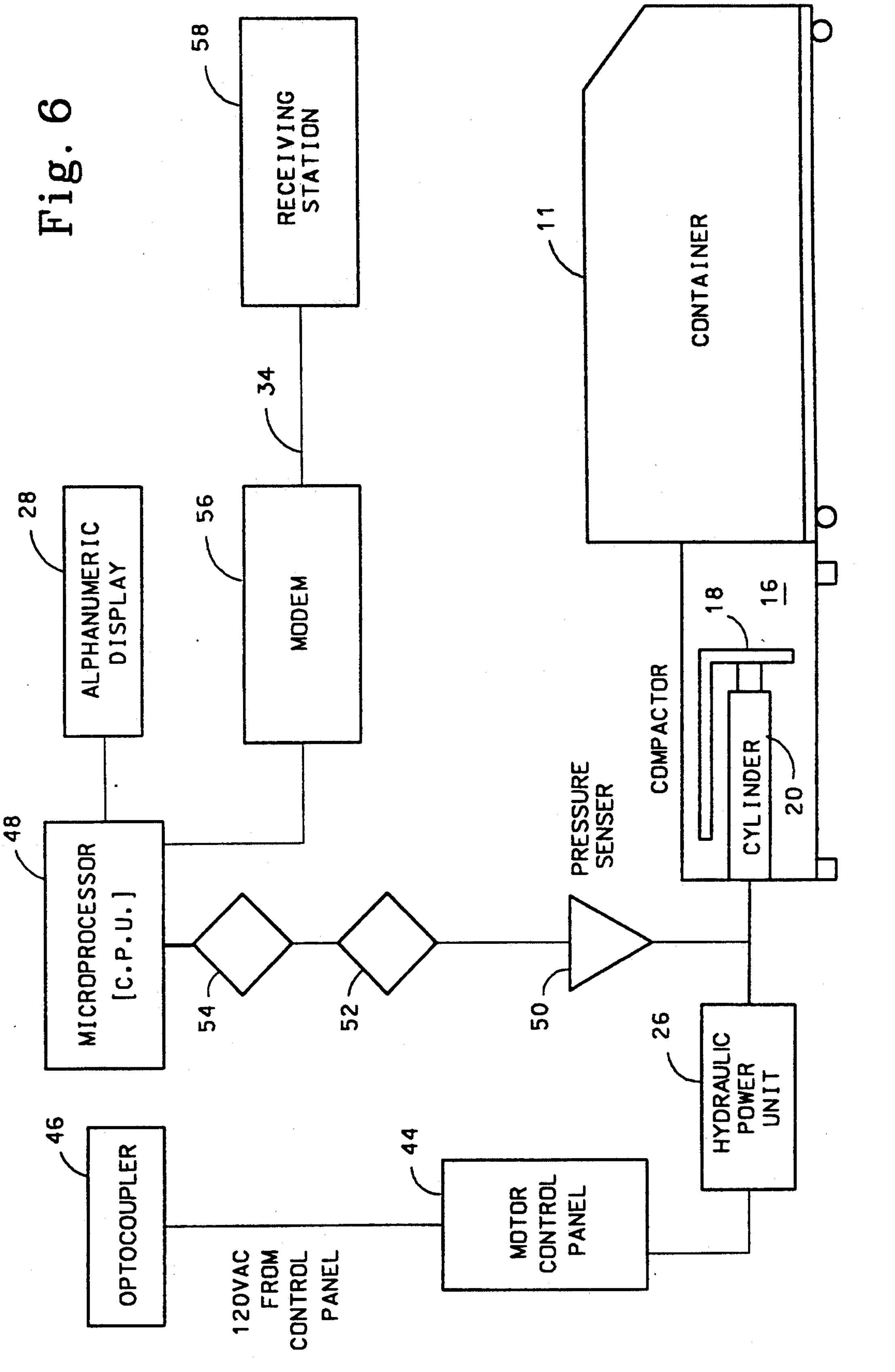
FIG. 6 is a schematic diagram of the system of the invention.

As best shown in FIG. 6, a compactor incorporating the fullness determining system according to the invention has a container 11 to which ram 18 is operably associated for causing waste to be transferred from the receiving chamber 16 into the container 11. The container 11 is similar to the container 10 of FIGS. 1-3, with the exception that the container 11 is a roll-off container which is separable from the housing 42 in which the ram 18 reciprocates. FIG. 6 also illustrates the hydraulic power unit or source 26 which supplies the hydraulic pressure to the cylinder 22 for causing extension and retraction of the piston 24. A motor control panel 44 is disposed within the control unit U and causes operation of the electric motor driving the variable output pump comprising the hydraulic source 26. The motor control panel is, preferably, operated at 120 VAC. An optocoupler 46, which preferably is an NEC PS 2506-1, is interposed between the motor control panel 44 and a microprocessor 48, which preferably is an Intel 87C51 with 128 bytes of RAM and 4 K of ROM for the software, in order to prevent damage to the microprocessor 48 as might occur due to current spikes, noise, and like energy emanating from the motor control panel 44. The motor control panel 44 causes a signal to be sent to the microprocessor 48, by way of optocoupler 46, in order to permit the microprocessor 48 to count each cycle or reciprocation of the ram 18. The motor control panel 44, preferably, is caused to operate by the start push button 30 when the charge hopper 12 has been adequately filled with waste.

Pressure transducer 50, which preferably is a Barksdale Controls 303N1-14-CG-10-P, monitors the hydraulic pressure applied to the cylinder 22 by the power source 26 and generates an electrical output in response thereto. The voltage output from the transducer 50 is preferably from 1 to 11 VDC, with 1 volt indicating 0 psi and 11 volts indicating 4,000 psi. A calibration potentiometer 52 is interposed between transducer 50 and converter 54 in order to take into account the maximum pressure of source 26 as a function of transducer 50. Converter 54 converts the analog pressure signal from the transducer 50 into an electrical signal usable by the microprocessor 48. The microprocessor 48 utilizes an IBM or IBM compatible computer with DOS 2.1 or higher operating software, and may have a National Semiconductor 74HC943 modem, at 300 baud, and a printer in the event the telecommunications option is desired. The software is compatible with a Hayes modem having a Bell 103 support.

Display 28, as earlier noted, is mounted to the control unit U and has four digits of LED display in order to provide not only fullness information but also error, maintenance, and like status information. In the event either of the telecommunications option is desired, then modem 56 is mounted within the control unit U and is operably connected to microprocessor 48. Telephone line 34 then extends between the modem 56 and the remote receiving station 58.

Figure 7:
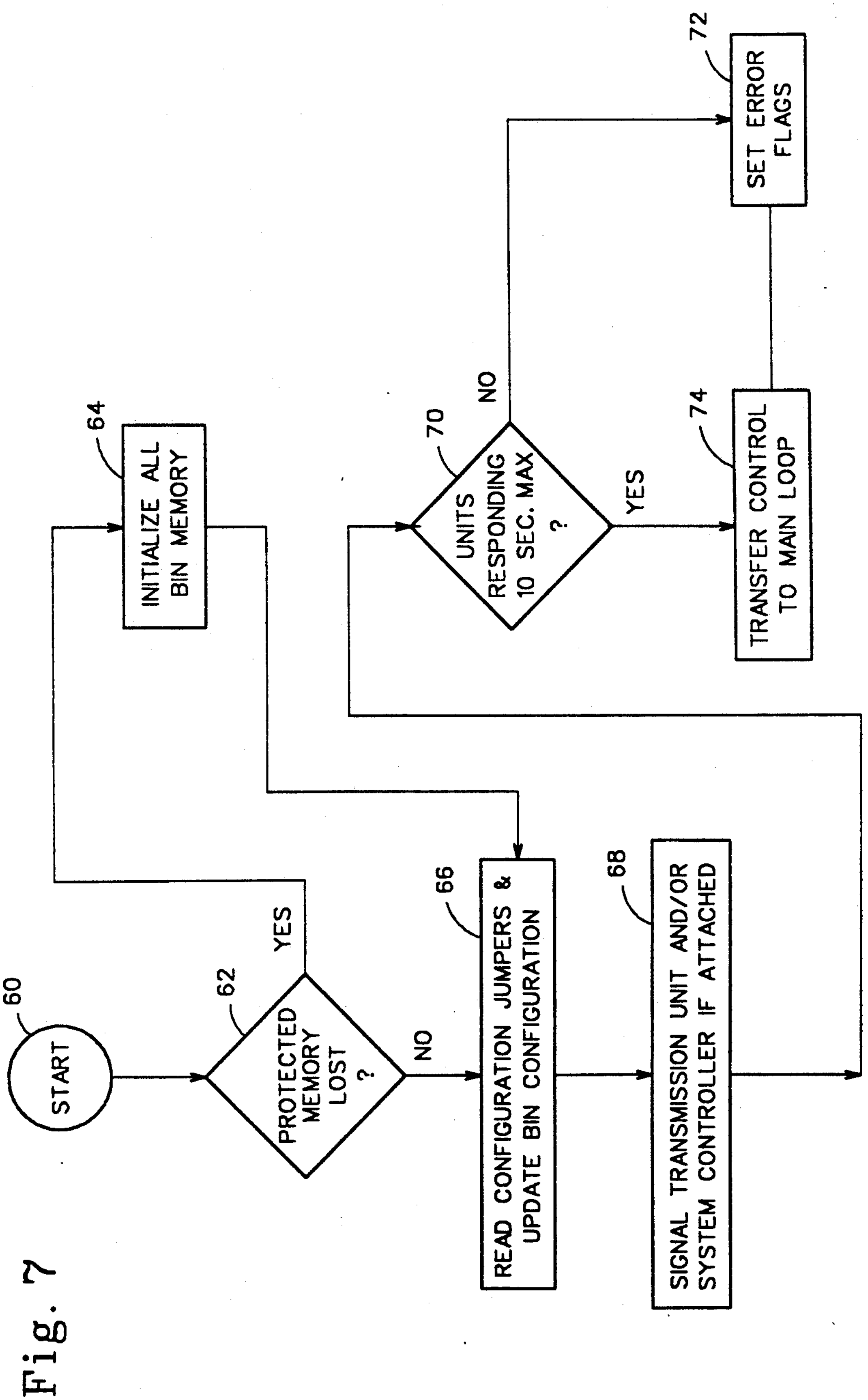
FIG. 7 is a flow chart illustrating the power on phase of an algorithm of the invention.

FIG. 7 illustrates one aspect of the computer control provided by the software of the microprocessor 48 contained within the control unit U. The algorithm illustrated in FIG. 7 is common to all versions of the disclosed invention, whether the compactor C has local display only, computer transmission to the remote receiving station 58, or audio transmission to the receiving station.

Upon the microprocessor 48 being energized, then the computer control at 60 begins to make certain that the system is operable. At 62 the program inquires whether the protected memory concerning the total number of cycles for the particular filling sequence and the historical total number of cycles for that compactor C are still retained in memory. If the protected memory has been lost, then the memory is initialized at 64 and the output is forwarded to 66. At step 66, the configuration jumpers are read and the data on the configuration is updated. The configuration jumpers comprise four DIP switches which are set in the field. Switch no. 1 (not shown) is used to permit a dynamic pressure reading corresponding to the actual pressure to be displayed when set to the on position. Switch no. 4 (not shown) relates to the setting on the solenoid valve which directs hydraulic fluid from source 26 to cylinder 22. DIP switch no. 4 tells the microprocessor 48 whether ram 18 is being extended or retracted, so that the algorithm knows whether to monitor the output pressure of source 26. DIP switch no. 3 (not shown) is used to set the pressure limit which is utilized for distinguishing between a potentially spurious pressure reading and an accurate one. In one position DIP switch no. 3 allows no more than a pressure increase of 2%, while in the other orientation a 5% increase is permissible. We prefer that DIP switch no. 3 normally be set for the 2% pressure limit, although the 5% increase may be used when a large compactor is connected to a relatively small container. DIP switch no. 1 (not shown) may be used in a diagnostic mode in order to have the actual hydraulic pressure displayed on display 28 during cycling of ram 18. Similarly, DIP switch no. 2 may be set to a diagnostic mode in order to display on display 28 the internal memory of microprocessor 48.

Once the configuration jumpers have been read and the bin configuration has been updated, then the algorithm inquires at 68 whether the signal transmission unit and/or the system controller utilized for the audio and computer telecommunications options are attached. The microprocessor 48 may be expanded to accommodate these options by the provision of additional boards containing the preprogrammed firmware. The signal transmission unit and/or the system controller are given 10 seconds in which to respond at 70, and if they do not respond then error flags are set at 72. If they do respond in the allotted time, then a transfer occurs at 74 to the main loop.

Figure 8:
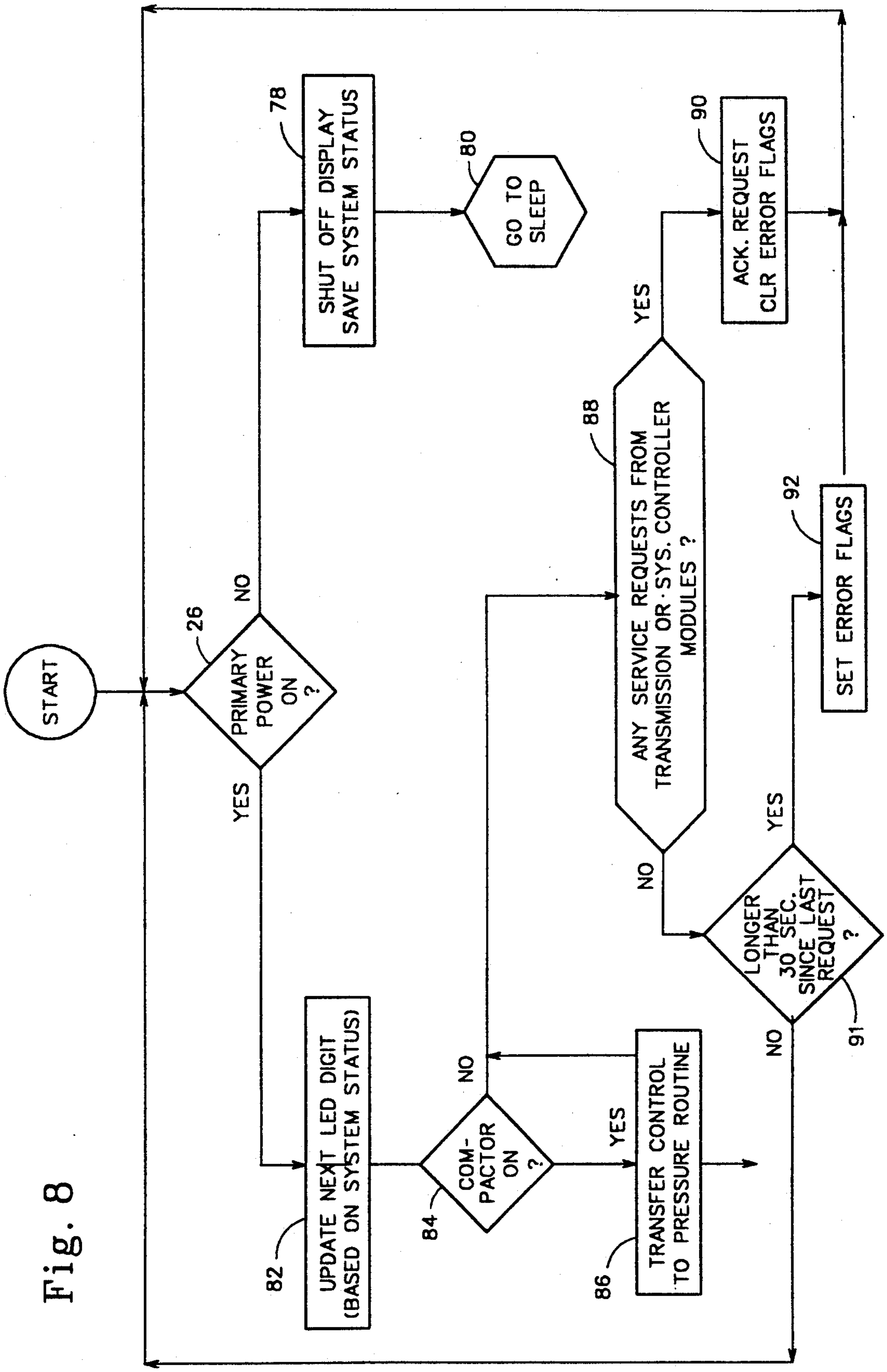
FIG. 8 is a flow chart illustrating a main loop phase of an algorithm of the invention.

FIG. 8 illustrates the main loop portion of the algorithm to which control is transferred from the power on routine of FIG. 7. The algorithm of FIG. 8 first inquires at 76 whether the primary or main power is on. We prefer that the main power be 110 volt and 60 Hz service, because that is customarily available at most locations where a compactor has been placed. If the primary power is not on, then the display 28 is turned off at 78 and the system status is stored in the memory of the microprocessor 48. Once the display 28 has been turned off and the system status has been stored, then the unit is placed into a sleep mode at 80 until such time as the primary power is restored.

If the primary power is detected at 76 as being on, then the display 28 is updated at 82. As earlier noted, the display 28 is a four digit LED display and there is a need to periodically refresh each of those digits. The digits are refreshed several times a second, as those skilled in the art will understand, and it is therefore not apparent, or only slightly so, to the user. The display 28 not only displays the fullness of the container C, but also provides a visual display when the ram 18 is cycling and also may be used for displaying other pertinent information. The algorithm then inquires at 84 whether the hydraulic power unit 26 is cycling the ram 18 at 84. If the ram 18 is being cycled, then the algorithm transfers control to the routines of FIGS. 9 and 9A at 86.

Once cycling of the ram is completed or if it is determined at 84 that the ram 18 is not cycling, then the algorithm inquires at 88 whether any service requests have been received from the transmission or system controller modules at 88. If a request has been received, then it is acknowledged at 90 and any responsive error flags which had been set are cleared. If no service requests have been detected, then the algorithm inquires at 91 whether it has been more than 30 seconds since the last request. If it has not been more than 30 seconds then the algorithm returns to 76 and begins the cycle again. If it has been more than 30 seconds since the last request, then error flags are set at 92 in order to indicate that the transmission or system controller module, as appropriate, is not operating properly. The 30 second delay at step 90 is used to take into account the fact that the transmission and system controller modules make their requests on a periodic basis.

Figure 9:
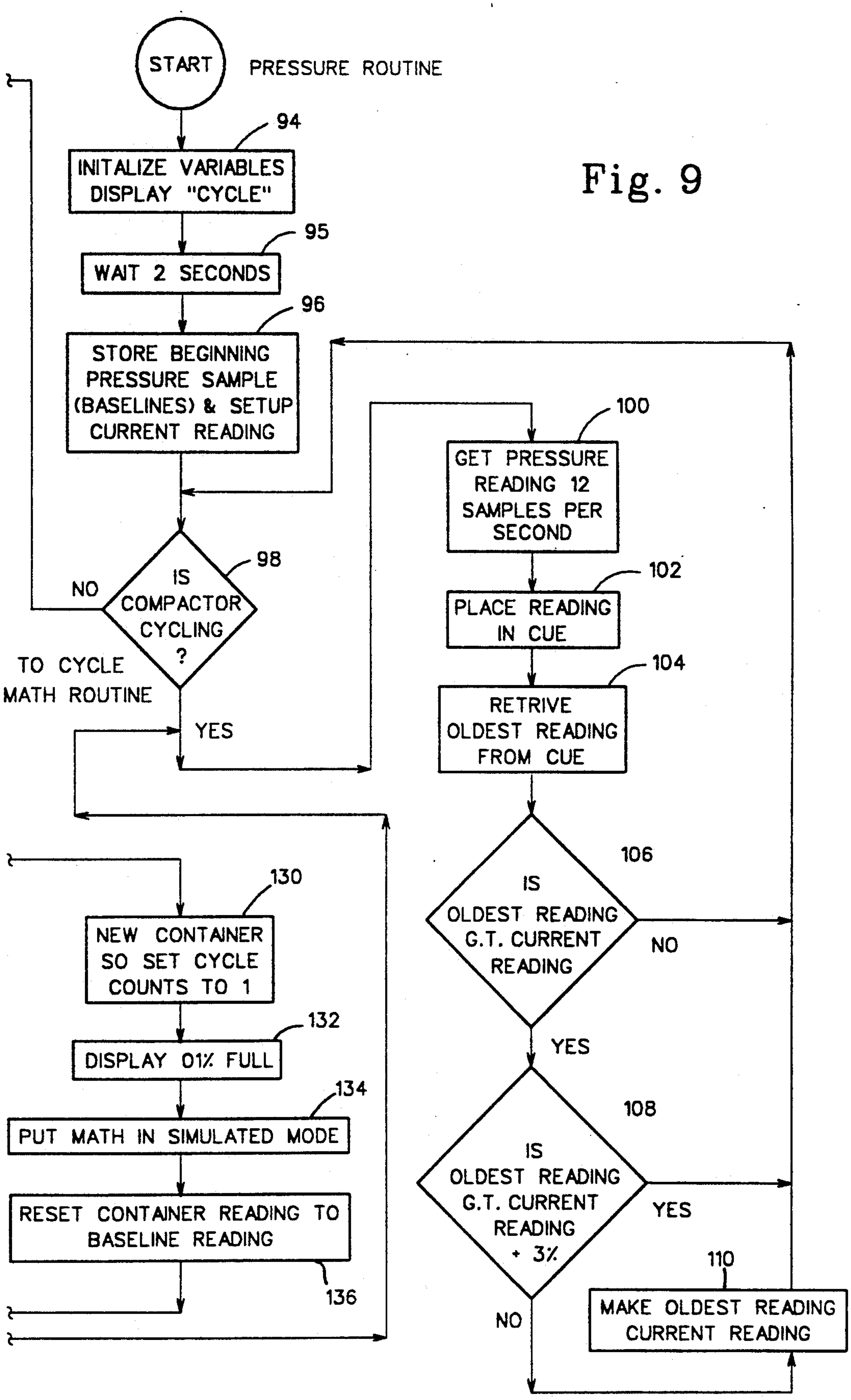
FIG. 9, 9A and 9B are flow charts illustrating the fullness determination algorithms of the invention.

The variables are initialized at 94, as best shown in FIG. 9, after transfer from step 86. As earlier noted, DIP switch no. 3 sets the pressure limit which is utilized by the algorithm of FIGS. 9 and 9A for detecting between an allowable pressure increase and one which appears to be erroneous. The pressure increase provided by DIP switch no. 3 is read at 94, and there is a 2 second delay at 95 while the system readies itself and during this time display 28 indicates that ram 18 is cycling. At 96 the algorithm stores the initial or baseline pressure and sets up the current pressure reading from transducer 50. At 98 the algorithm asks whether the ram 18 is cycling. If the ram 18 is cycling, then twelve (12) samples per second of the output pressure of source 26 are taken out at 100 from transducer 50. The readings are placed into a queue at 102, with a 0.25 second delay. The oldest reading is retrieved from the queue at 104, and an inquiry is made at 106 whether the oldest reading is greater than the current now permitted maximum reading. If the oldest reading is not greater than the current reading, then the algorithm returns to 98 to inquire whether the ram 18 is cycling. If the oldest reading is greater than the current permitted maximum reading, then an inquiry is made at 108 into whether it exceeds the current permitted maximum by 3% or more. If the oldest reading exceeds the current permitted maximum by 3% or more, then the algorithm returns to 98 and cycling continues. This feature permits pressure spikes to be ignored. If the oldest reading is less than the current permitted maximum by less than 3%, then the oldest reading is made equal to the current permitted maximum at 110. The pressure over a cycle may, therefore, increase by more than 3% of the pressure achieved during the previous cycle, because we merely require that the increase between samples be no more than 3%. The maximum stored pressure from one cycle to the next, however, may be much more than 3%. We continue to store a pressure which is the maximum limited pressure achieved during a given cycle. It is the maximum reading which we use in the fullness calculations.

Figure 9A:
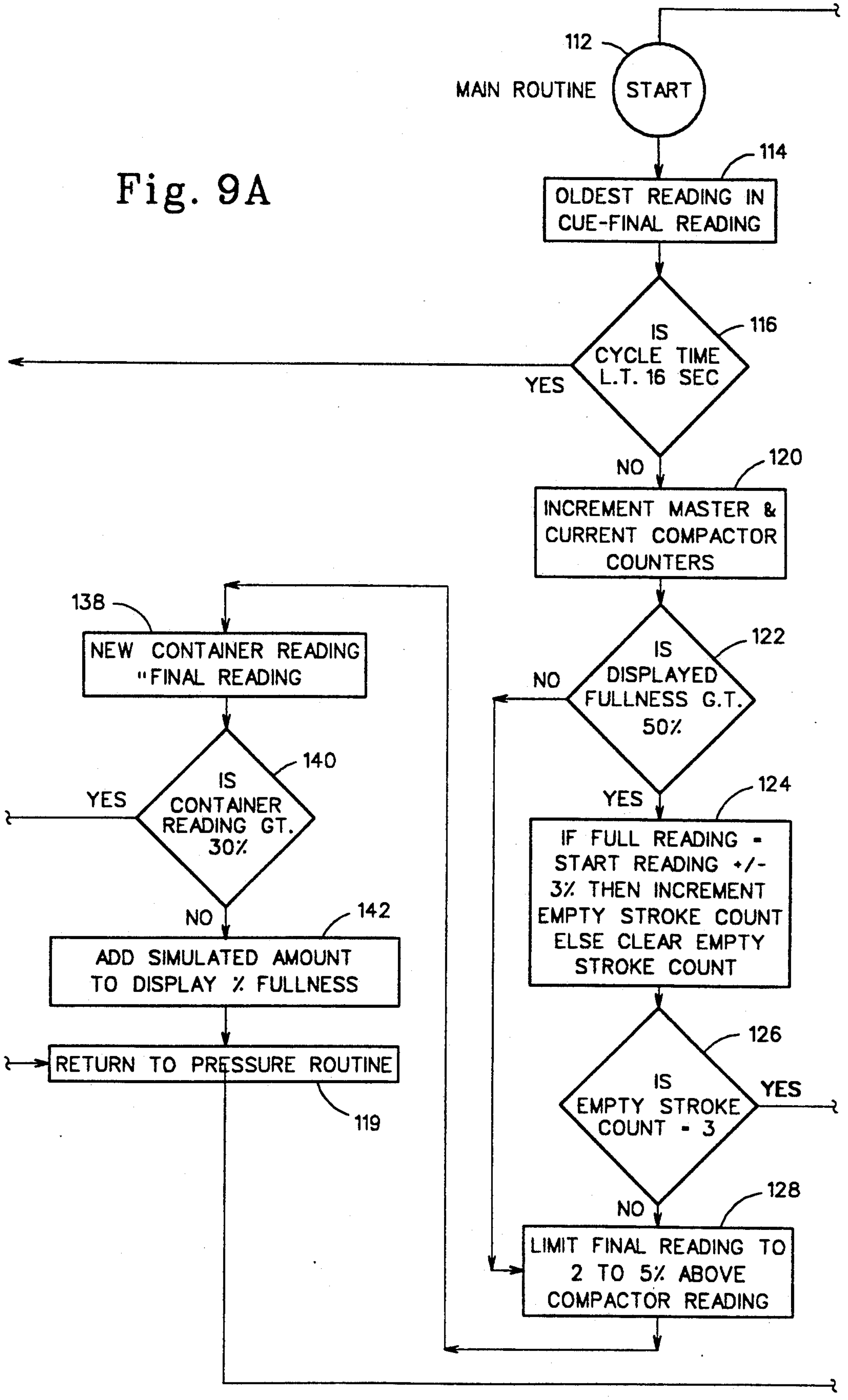
Figure 9B:
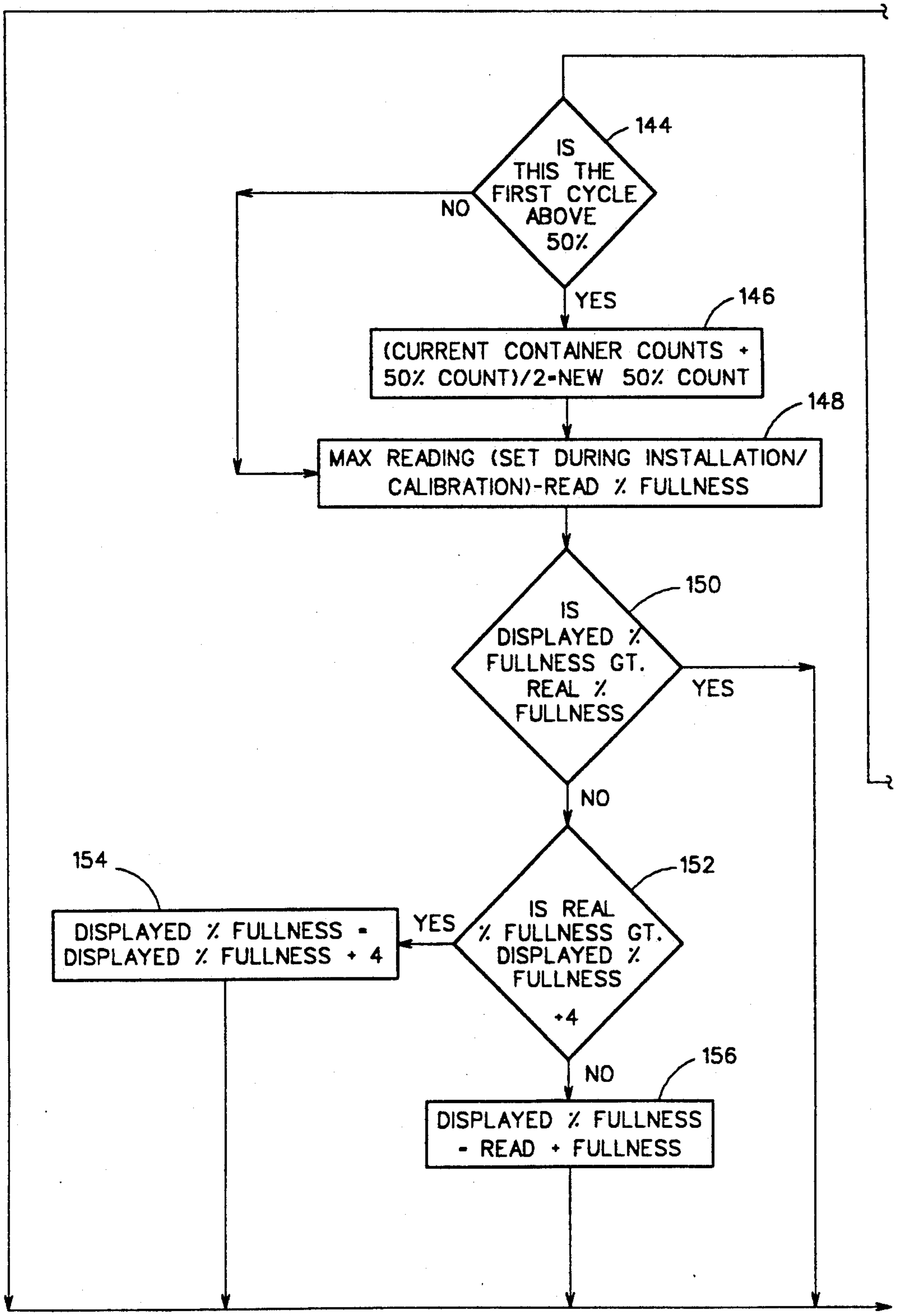

If it is determined at 98 that the ram 18 is not cycling, then the algorithm proceeds to step 112 of FIG. 9A. The oldest reading in the queue is set to be the final reading for that cycle at 114, and an inquiry is made at 116 into the time required to cycle ram 18. If the cycle time was less than 16 seconds, then the algorithm exits to 118 in order to return to step 100 of the pressure routine. If the cycle time exceeded or equaled 16 seconds, then the master historical and current counters are incremented by one (1) at 120. As earlier noted, the software stores in the memory of microprocessor 48 information on ram reciprocations not only during the current filling sequence but also over the life of the compactor C. Historical data is used to permit more accurate approximations than could otherwise be achieved.

An inquiry is made at 122 into whether the percent fullness displayed on display 28 is greater than 50% If the displayed percentage fullness is less than 50%, then an inquiry is made at 124 into whether the final reading of 114 is equal to the baseline reading +/−3%. The baseline reading is that pressure required to move ram 18 when container 10 is empty. If the displayed percent fullness is over 50%, but the final reading is approximately the baseline pressure, than a presumption is made that possibly container 10 has been emptied. An inquiry is therefore made at 126 into whether three (3) empty strokes have been counted. If fewer than three (3) empty strokes have been counted, then the final reading, which is the maximum pressure for that cycle, is limited to an increase of 2% or 5%, based upon the setting of DIP switch no. 3, at 128 of the maximum pressure for the previous cycle. Similarly, if the displayed percentage was not greater than 50% at 122, then the final reading for the current cycle would be limited by the setting of DIP switch no. 3 at 128 as applied to the previous cycle. The limiter of 128 causes a calculated pressure to be substituted for the read pressure so that the curve of FIG. 4 may be approximated.

If three (3) empty strokes have been counted at 126, then it is assumed at 130 that the container 10 has been emptied. The current cycle counter is therefore set to 1, and the percent fullness displayed on display 28 is set to 1% at 132. Thereafter the percent fullness is based upon ram 18 reciprocations at 134 and the baseline reading is used for the pressure calculations at 136. The algorithm then defaults to 118 in order to return to step 100 of the pressure routine of FIG. 9.

Once it has been determined that container 10 has not been emptied and the final reading has been limited at 128 or does not exceed the limited amount, then the current container pressure reading is set to be the final pressure reading at 138. An inquiry is then made at 140 into whether the current pressure reading is greater than 50% of the maximum output pressure of source 26. If the current pressure reading is less than 50% of the maximum pressure of source 26, then the percent fullness is based upon ram reciprocations at 142 and the calculated percentage is then displayed on display 28.

As noted, we utilize ram reciprocations as an approximation for fullness until the pressure curve achieve a relatively high degrees of reliability. The approximation of fullness is based upon the number of reciprocations which the algorithm presumes will be required for the pressure to achieve the 50% maximum value. Thus, if we assume that 100 reciprocations will be required to achieve an hydraulic pressure equal to 50% of the maximum pressure of source 26, then each reciprocation will increment the display by 0.5%. FIG. 5A illustrates the assumption which we utilize until the 50% pressure point is reached. The number of reciprocations assumed to be required to reach the 50% pressure level is a dynamic figure, and is adjusted during each filling sequence.

The percent fullness of 142 is displayed locally on display 28 in order to permit the operator to more accurately monitor the filling sequence. We display the percent fullness instead of an indication solely of partial or complete fullness, because the operator therefore has a better appreciation of how rapidly container 10 is being filled. The operator can make a better approximation of how many reciprocations can still be made for the container, and may also better estimate when the container 10 will be ready to be emptied. Because of the limiter of 128, the operator sees that container 10 is filling at a relative constant rate, even though the actual fullness, particularly when the pressure is below the 50% value, may be somewhat different than the displayed percentage. The displayed percentage eventually is the same as the actual fullness, but we have avoided displaying what could be somewhat substantial, yet irrelevant, changes during the initial phase of the filling sequence.

After it has been determined that the pressure reading exceeds the 50% target at 140, then an inquiry is made at 144 about whether the most recent reciprocation was the first cycle during which the 50% target had been exceeded. If it is the first cycle at which the target has been exceeded, then the number of reciprocations required to reach the 50% target is adjusted at 146. The target is adjusted by adding the previous estimate of the number of cycles required to achieve the target with the actual number required during the current filling sequence and dividing the total by 2. The result is the target number of reciprocations for the next filling sequence to be used at 134 for the fullness calculations.

After the target for the next sequence has been calculated or it has been determined that the previous cycle was not the first one subsequent to the 50% pressure target having been reached, then the algorithm determines the percent fullness at 148 based upon the pressure reading. As illustrated in FIG. 5, the percent fullness is a function of the pressure after the 50% target has been achieved. The calculated fullness is a function of the pressure between the 50% pressure target and the maximum pressure which source 26 may generate.

An inquiry is made at 150 into whether the displayed percent fullness exceeds the percent fullness calculated at 148, because the pressure even above the 50% target may experience upward and downward excursions. If the displayed percent fullness exceeds the percent fullness calculated at 148, then the algorithm exits to 118 in order to return to the pressure routine. We do not allow the displayed percentage to decrease, because the operator might then become confused over how filling was proceeding. We therefore allow the displayed percent fullness to remain constant while the container 10 continues to fill, because at some point the calculated fullness will equal the displayed fullness.

If the displayed fullness is not greater than the calculated fullness, then inquiry is made at 152 into whether the calculated fullness exceeds the displayed fullness plus 4%. If yes, then the displayed fullness is set equal to the displayed fullness plus 4% at 154 in order to cause the displayed fullness to increase at a relatively moderate rate. The filling will eventually cause the calculated fullness to converge on the displayed fullness, and a gradual change prevents the operator from becoming unnecessarily alarmed by what otherwise would seem to be rapid filling of container 10. If the calculated or "read" fullness does not exceed the displayed percent fullness plus 4%, then the displayed percent fullness is set equal to the read fullness at 156.

Local display on display 28 of the fullness information is important should the user not desire the audio or telecommunications options, and also because it allows the user to monitor the filling of containers 10 or 11 over the course of numerous cycles of a particular filling sequence. It is not unusual for there to be different operators for the compactor C, and continuous local display therefore allows each of those operators to have an appreciation for the degree of fullness.

Should the user desire the data transmission option, then FIGS. 10–12A disclose the algorithms used by the control unit U for transmitting the information by virtue of the modem 56 and the telephone line 34 to the receiving station 58. Because the microprocessor 48 processes the information locally at the compactor C, then it is a relatively simple matter for supplying the remote receiving station 58 with information indicating the compactor C which is being monitored, the fullness of the compactor, and any errors which have been detected.

We prefer that the compactor C either transmit its data to the remote receiving station 58 on a periodic basis, or that it not transmit the information until a predetermined fullness level has been achieved. Periodic data transmission has the advantage of allowing more careful monitoring of the compactor C, but it also necessitates that the remote receiving station 58 be capable of handling the calls from each of the units C. Permitting data transmission to occur only when, for example, the unit has achieved a 70% fullness level minimizes the need for the receiving station 58 to handle numerous phone calls, and also minimizes the data interpretation which must occur at the remote receiving station 58 when the information is received. Regardless of whether the data transmission or audio transmission options are selected, they serve the further advantage of avoiding the need for a dedicated telephone line to be run to the compactor C as would be required should the remote receiving station 58 be interrogating the compactor C. Because we have the compactor C call the remote receiving station 58, then there may be other users on the same telephone line. A dedicated phone line is an added expense which our invention avoids.

Figure 10:
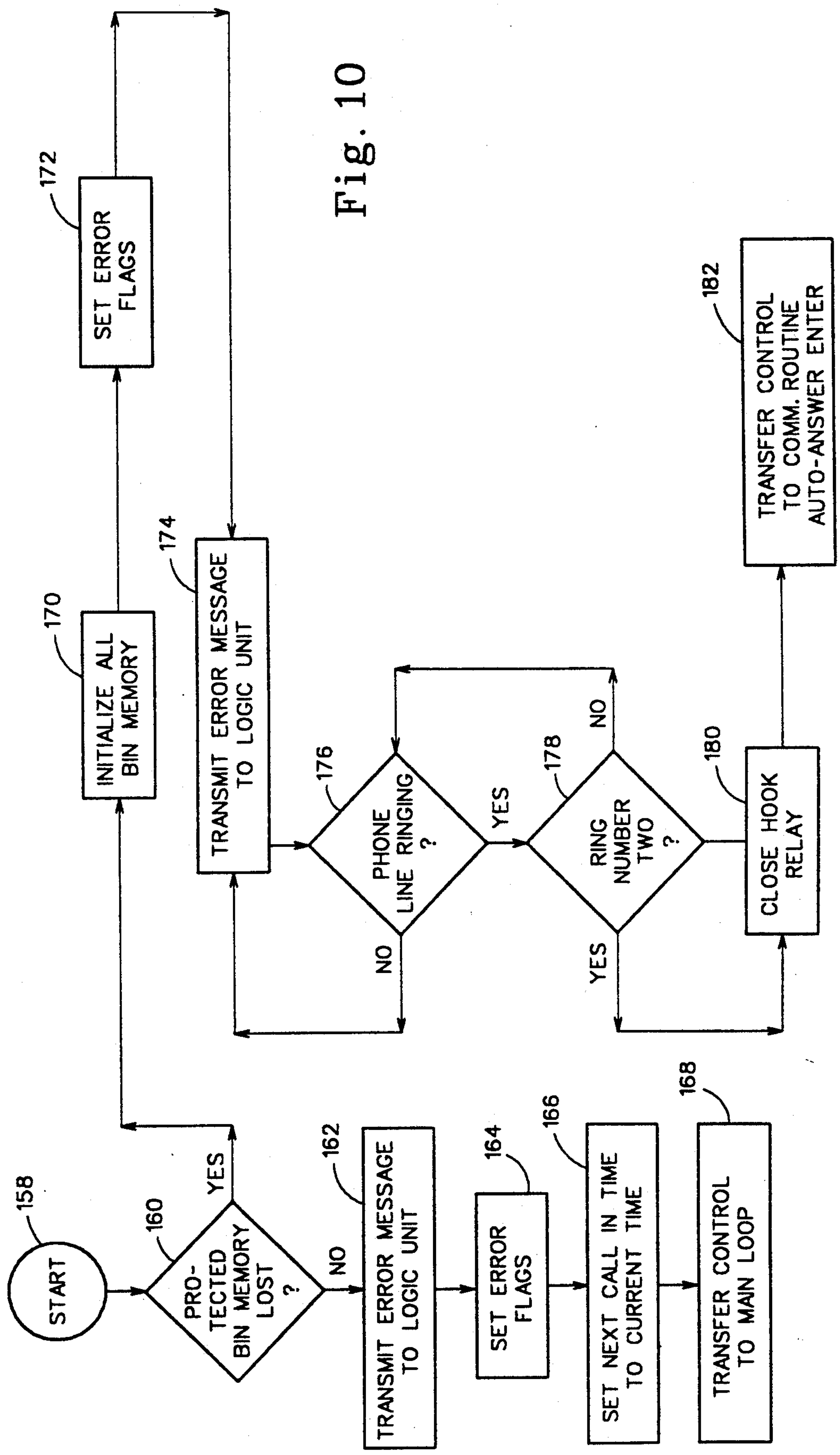
FIG. 10 is a flow chart illustrating the power on phase of an algorithm of the invention for transmitting data to a remote receiving station.

Once the data transmission unit has been energized at 158, then there is an inquiry made at 160 whether the protected memory has been lost. The protected memory for the data transmission unit of FIG. 10 is the call schedule, the telephone number to be called, and the unique identifier for the particular compactor unit C. If the memory has not been lost, then any error messages are transmitted at 162 to the logic unit. Error flags are then set at 164. The error messages are those which the control unit U has accumulated since the previous telephone call, such as those initiated at step 92 of FIG. 8. The algorithm then waits for the call in time to occur, and at 166 sets the next call in time to be the then current time if the current time is the time at which the next call is to be made. Once the call in time has been reached, then control is transferred at 168 to the main loop of FIG. 11.

Should the protected memory be lost, as determined at 158, then the algorithm initializes all BIN memory at 170. After the memory has been initialized, then the control unit U waits to receive a call from the remote station 58, because the control unit U in this situation does not know the current time, when it is to call, or where it is to call. This situation occurs in the event of an extended power failure, or like calamity. The algorithm sets the error flags at 172 and transmits the error messages to the logic unit of microprocessor 48 at 174. The algorithm inquires at 176 whether it is receiving a telephone call. If the telephone is ringing, then two (2) rings are allowed at 178 before the hook relay is closed at 180. Once the hook relay closes at 180, then control is transferred to the communications routine at 182 in order to allow the remote station 58 to provide the necessary information for the protected memory to make the data transmission system operable again.

Figure 11:
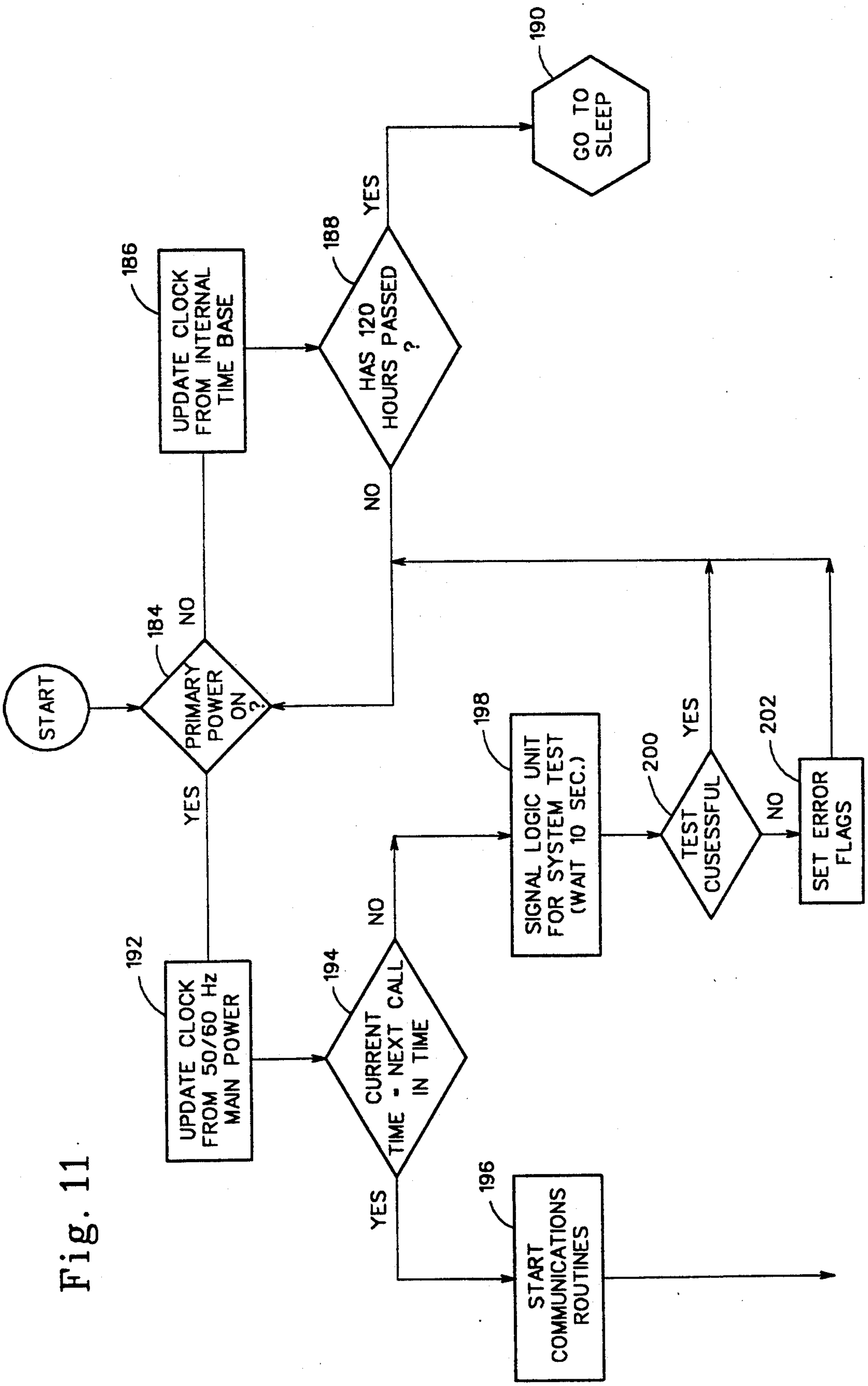
FIG. 11 is a flow chart of the main loop of a data transmission algorithm of the invention.

Once control is transferred from 168 to the main loop of FIG. 11, then the algorithm asks at 184 whether the primary power is on. If the power is not on, then the clock is updated from the internal time base at 186. The algorithm then asks at 188 whether the primary power has been off for 120 hours. If the primary power has been off for 120 hours, then the unit goes into a stand-by mode at 190 where the information in memory is preserved. The stand-by mode of 190 minimizes the demands on any back-up power supply which might be provided.

Should the primary power be on, then the internal clock is updated at 192 and the algorithm at 194 asks whether the current time is the next call in time. If the current time is the next call in time then the communications routines are started at 196. If the current time is not equal to the next call in time, then the logic unit is signaled to begin a system test at 198. The system test makes certain that the data transmission unit is operating properly because the algorithm at 166 had determined that the current time was the next call in time, but apparently some error has occurred. If the test is successful at 200 then the algorithm again returns to 184 to continue the cycle. If the test is not successful, then error flags are set at 202.

Figure 12:
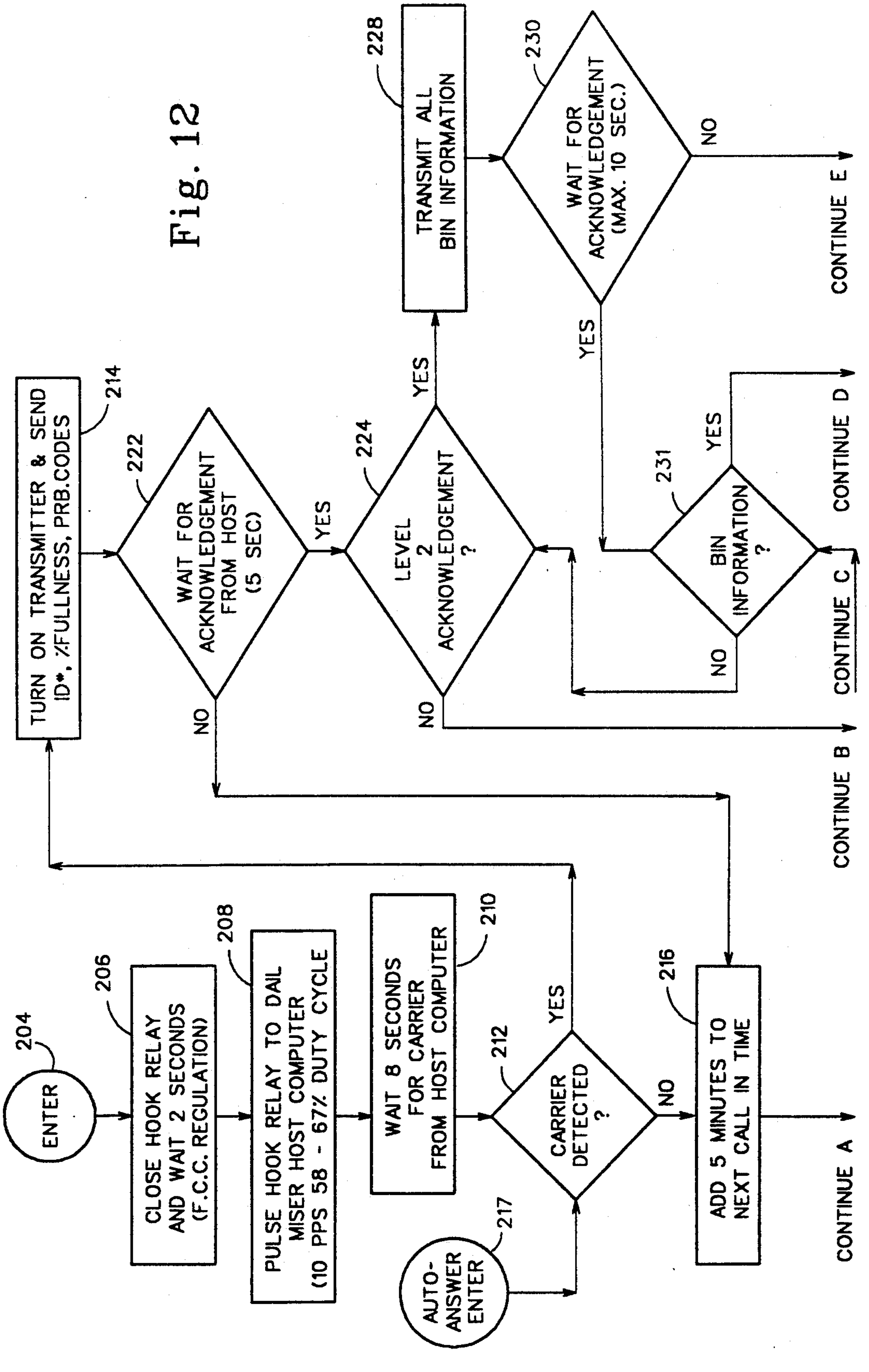
FIGS. 12 and 12A are flow charts of a telecommunications algorithm of the invention.
Figure 12A:
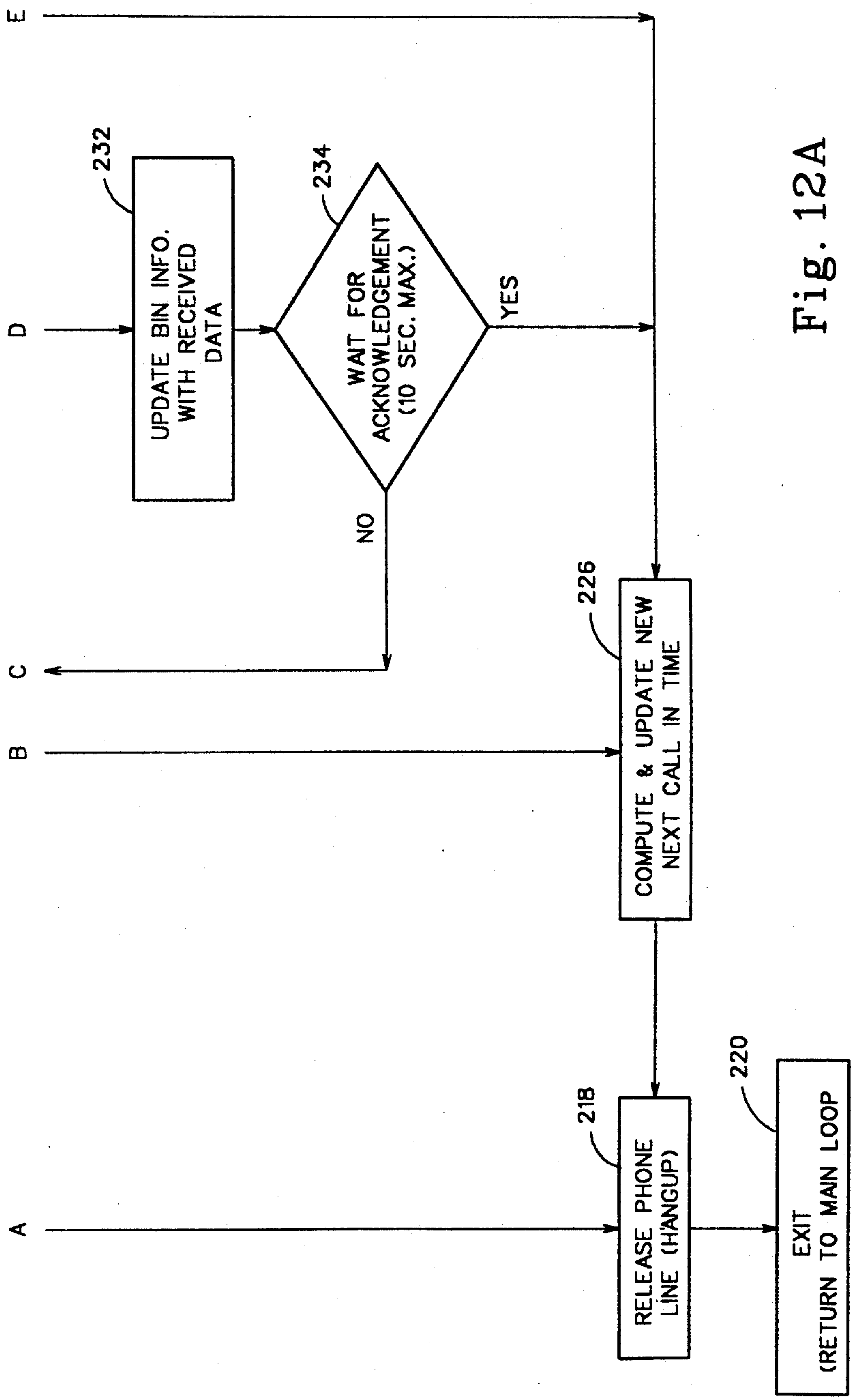
Figure 13:
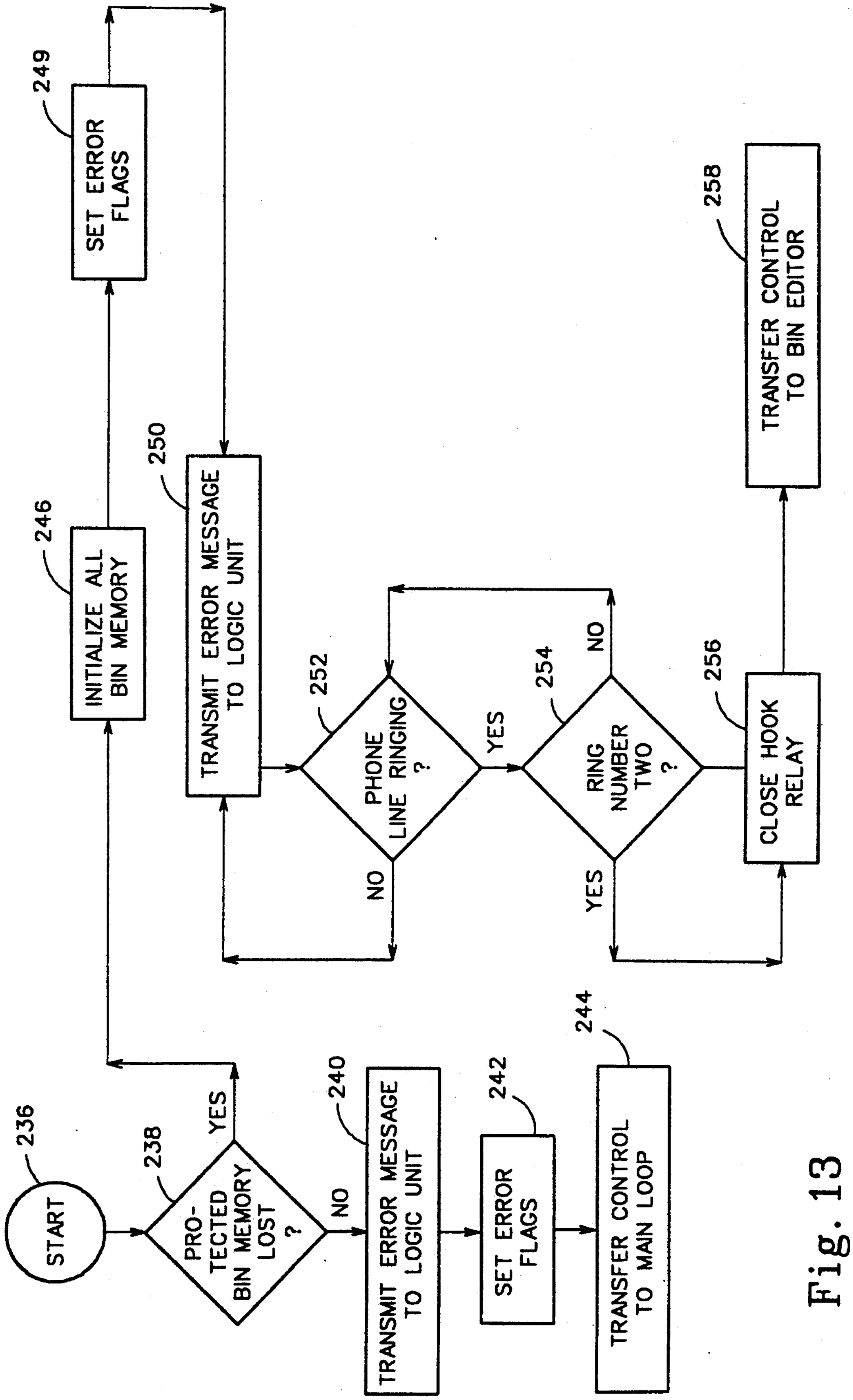
FIG. 13 is a flow chart of the power on phase of an algorithm of the invention for audio communication with a remote station.

In the event that the communications routines of 196 are started, then, as best shown in FIG. 12, the algorithm at 204 directs that the hook relay be closed at 206 and that a 2 second delay be given. Once the 2 seconds have elapsed, then the hook relay is pulsed in order to dial the central receiving station 58 at 208. An elapsed time of 8 seconds occurs at 210 in order to await the carrier signal from the host computer at the receiving station 58. If the carrier is detected at 212, then the data transmitter is initiated at 214 in order to transmit the unique identification number, the percentage fullness, and any error messages as may be appropriate to the host computer.

In the event that the protected BIN memory has been lost at 160, then an inbound telephone call permits the detection of a carrier signal at 212, and this initiates the initialization procedure derived from 182 for replacing the lost protected memory. The auto-answer enter 216 permits the remote computer at the receiving station 58 to be used to update the protected memory with the appropriate information which had been lost.

Should the carrier not be detected at 212, then the next call in time is set to be 5 minutes from the then current time at 216. The algorithm then releases the phone line at 218 of FIG. 12A and returns to the main loop of FIG. 11 at 220.

Once the unique identification number, percentage fullness, and error messages of 214 have been transmitted to the host computer at the receiving station 58, then the algorithm waits at 222 for an acknowledgement from the host computer that the information is received. If no acknowledgement is received within 5 seconds, then the algorithm presumes that some default has occurred and exits to 216 in order to attempt transmission again in 5 minutes.

Assuming that the host computer acknowledges receipt of the information, then the algorithm asks at 224 whether a Level 2 acknowledgement has been received. If not, then the algorithm proceeds to 226 of FIG. 12A in order to update the next call in time and permit the phone line to be released at 218 in order to be ready for the next telephone call. The next call in time is updated based upon preprogrammed instructions from the operator, and the algorithm may be set to call the host computer as frequently as the operator believes necessary.

A Level 2 acknowledgement occurs when the remote receiving station 58 transmits to the control unit U information which is used by the microprocessor 48 to update its program. The Level 2 acknowledgement may occur through a touch tone telephone or a computer, and permits the current time, call in schedule, and like information to be changed. Thus, for example, if the compactor C has been experiencing an unusually large increase in operations, then instead of having the compactor C call in two times a day it may be reprogrammed to call in four times a day. Alternatively, it may be desired to have the compactor C call the remote location 58 only upon a certain percentage fullness being achieved, and triggering the call amount may be changed this way.

Should a Level 2 acknowledgement be received at 224, then the BIN information is transmitted from the host computer to the control unit U at 228. The control unit U waits at 230 for an acknowledgement that the information was transmitted at 228, and if the acknowledgement is received then an inquiry is made at 231 whether the information has, in fact, been received. If the information has been received at 230, then the memory of the microprocessor 48 is updated at 232 in response, and a delay of 10 seconds occurs at 234 to allow the microprocessor 48 to acknowledge that the information was received. If no acknowledgement is received within 10 seconds, then inquiry is again made at 230 whether the BIN information was received. If no acknowledgement is received at 234 within 10 seconds, then the algorithm returns to 231 to ask if BIN information was received. If no, then it returns to 224 to make certain that a Level 2 acknowledgement was received.

FIGS. 13-16 are directed to the audio option which the control unit U may have. Unlike the data transmission option of FIGS. 10-12, the voice transmission option causes a synthesized voice of the microprocessor 48 to be transmitted over the telephone line 34 to the remote receiving station 58. We prefer that an ISD 1016 chip be used for this purpose. The remote receiving station does not require a central computer if this option is selected, although we do recommend that there be an answering machine in order to make certain that the message is not lost.

Once the voice transmission unit is initiated at 236, then a inquiry is made at 238 into whether the protected memory has been lost. As with the data transmission unit of FIG. 10, the protected memory would include the current time, the next call in time, and the telephone number to be called. If the protected memory has not been lost, then any accumulated error messages are transmitted at 240 and error flags are set at 242. Once the error flags have been set, then control to the main loop of FIG. 14 is transferred at 244.

Should the protected memory be lost, then the memory is initialized at 246 in order to be ready to receive the information to be transmitted from the receiving station 58 with the next telephone call. Error flags are set at 248 to indicate that the memory has been lost and an error message is transmitted at 250 to the microprocessor 48. An inquiry is made at 252 into whether the telephone is ringing, and if it is whether the second ring has been received at 254. If two rings have been received at 254, then the hook relay is closed at 256 and control is transferred at 258 to the BIN editor of FIG. 16.

Figure 14:
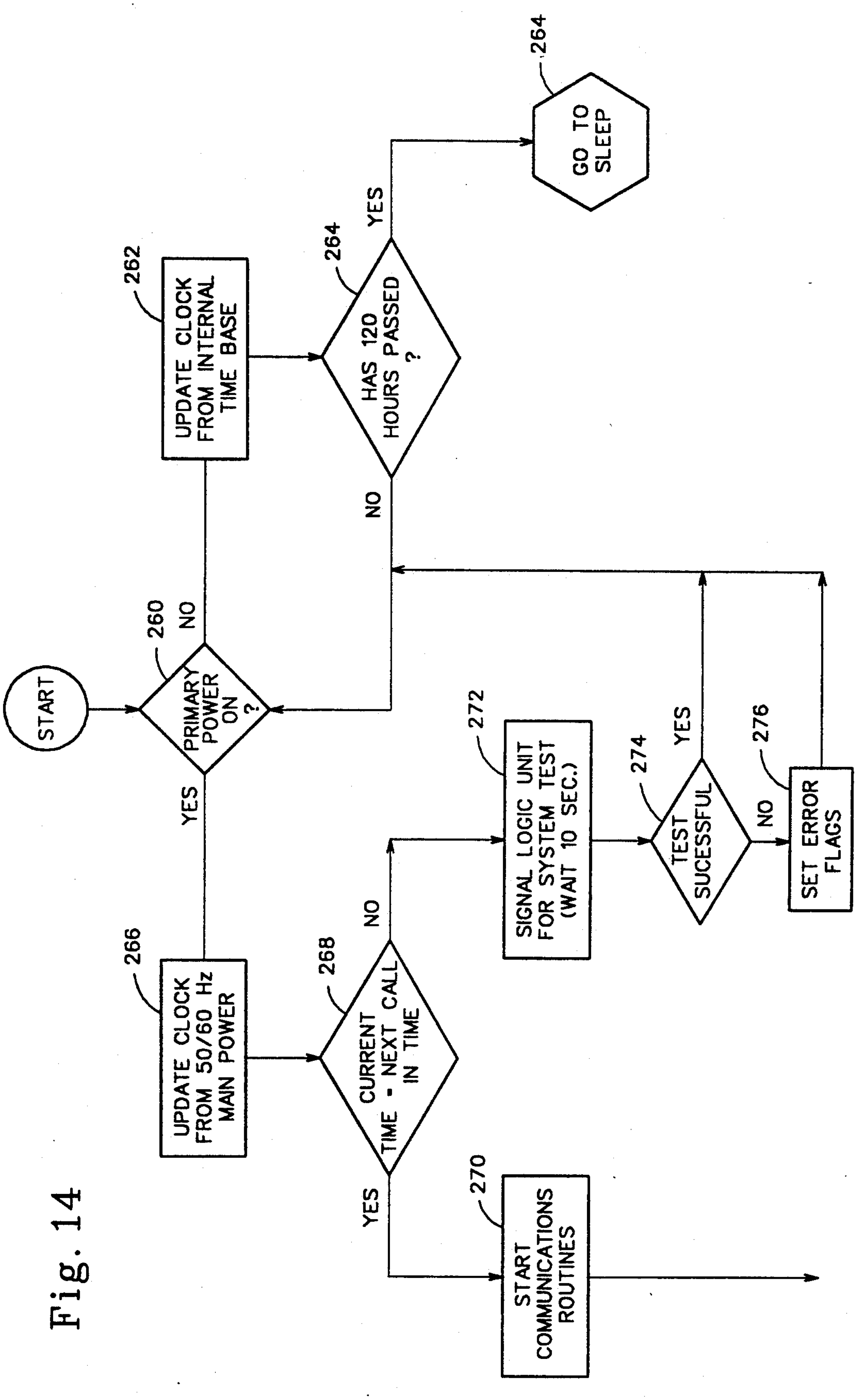
FIG. 14 is a flow chart of the main loop phase of a voice communication algorithm of the invention.

As with the data transmission unit of FIG. 11, the main loop of the audio option, as best shown in FIG. 14, inquires at 260 whether the primary power is on, and if not then the clock is updated at 262 from the internal time base. If 120 hours have elapsed at 264 since the primary power has been off at 262, then the algorithm defaults to the stand-by mode at 265 in order to preserve power.

In the event the primary power is on, then the internal clock is updated at 266 from the 50/60 Hz main power. An inquiry is then made at 268 whether the current time is the next call in time, and if yes then the communications routines are started at 270. If the current time is not the next call in time, then a signal is sent from the logic unit for a system test at 272. If the test is determined to be successful at 254, then the algorithm returns to 260 in order to see if the primary power is still on and in order to cycle through the system. If the test is not successful, then error flags are set at 276 before returning to the primary power check of 260.

Figure 15:
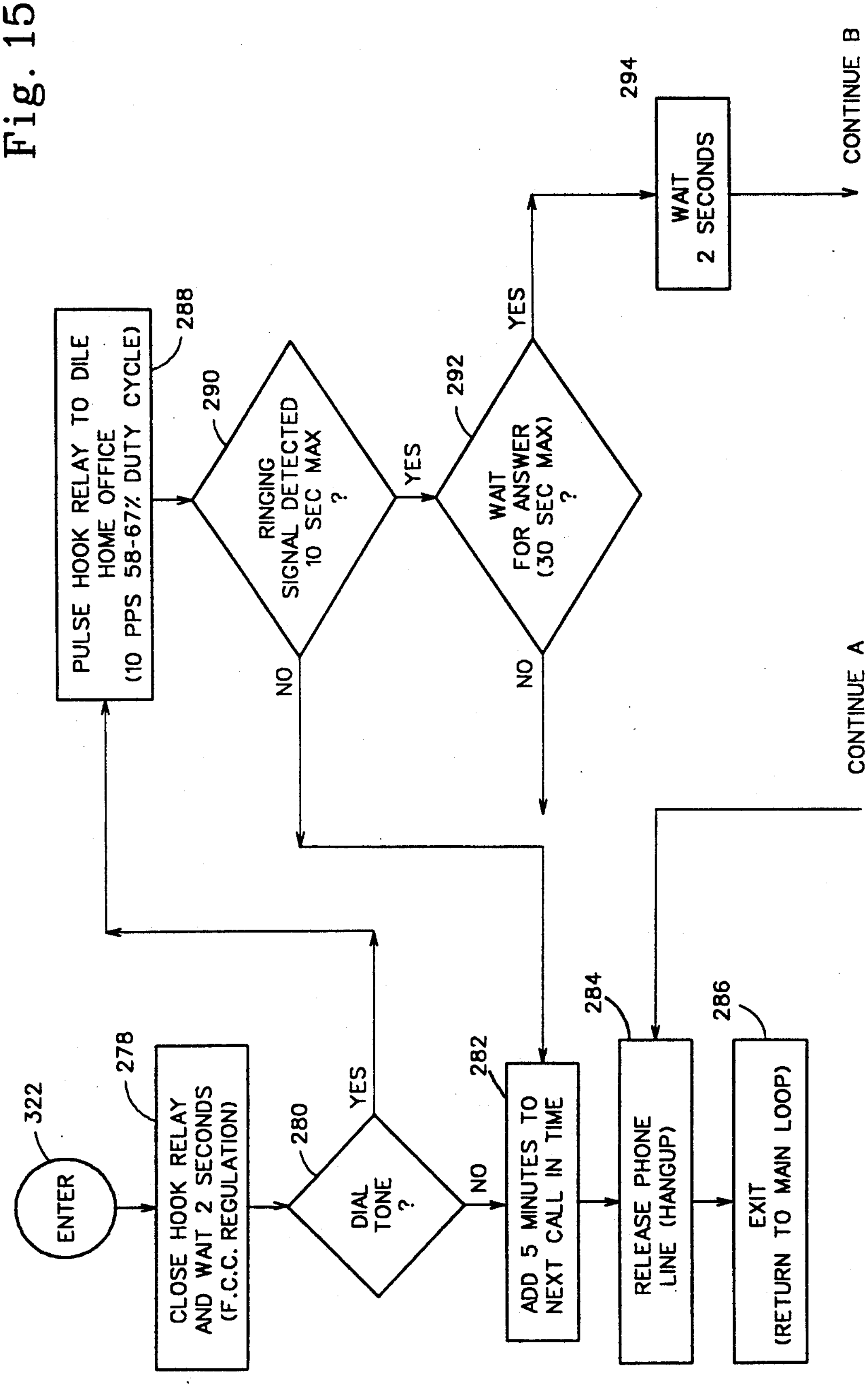
FIGS. 15 and 15A are flow charts of the communications phase of an algorithm of the invention for audio communications.

Should the communications routines be started at 270, then, as best shown in FIG. 15, the hook relay is closed at 278 and 2 seconds are allowed to lapse. An inquiry is made at 280 whether a dial tone has been received, and if not the next call in time is deemed to be 5 minutes from the then current time at 282. The phone line is then released at 284, and the main loop is returned to at 286.

Should a dial tone be detected at 280, then the hook relay is pulsed at 288 in order to dial the telephone at the remote receiving station 58. An inquiry is made at 290 into whether the ringing of the phone at the receiving station 58 has been detected within ten (10) seconds, and if not then a default to 282 is provided. If a ringing signal is detected at 290, then 30 seconds are permitted to elapse at 292 while the phone is being answered. If the phone is not answered within 30 seconds, then the default is made to 282 in order to begin the sequence again in 5 minutes.

Figure 15A:
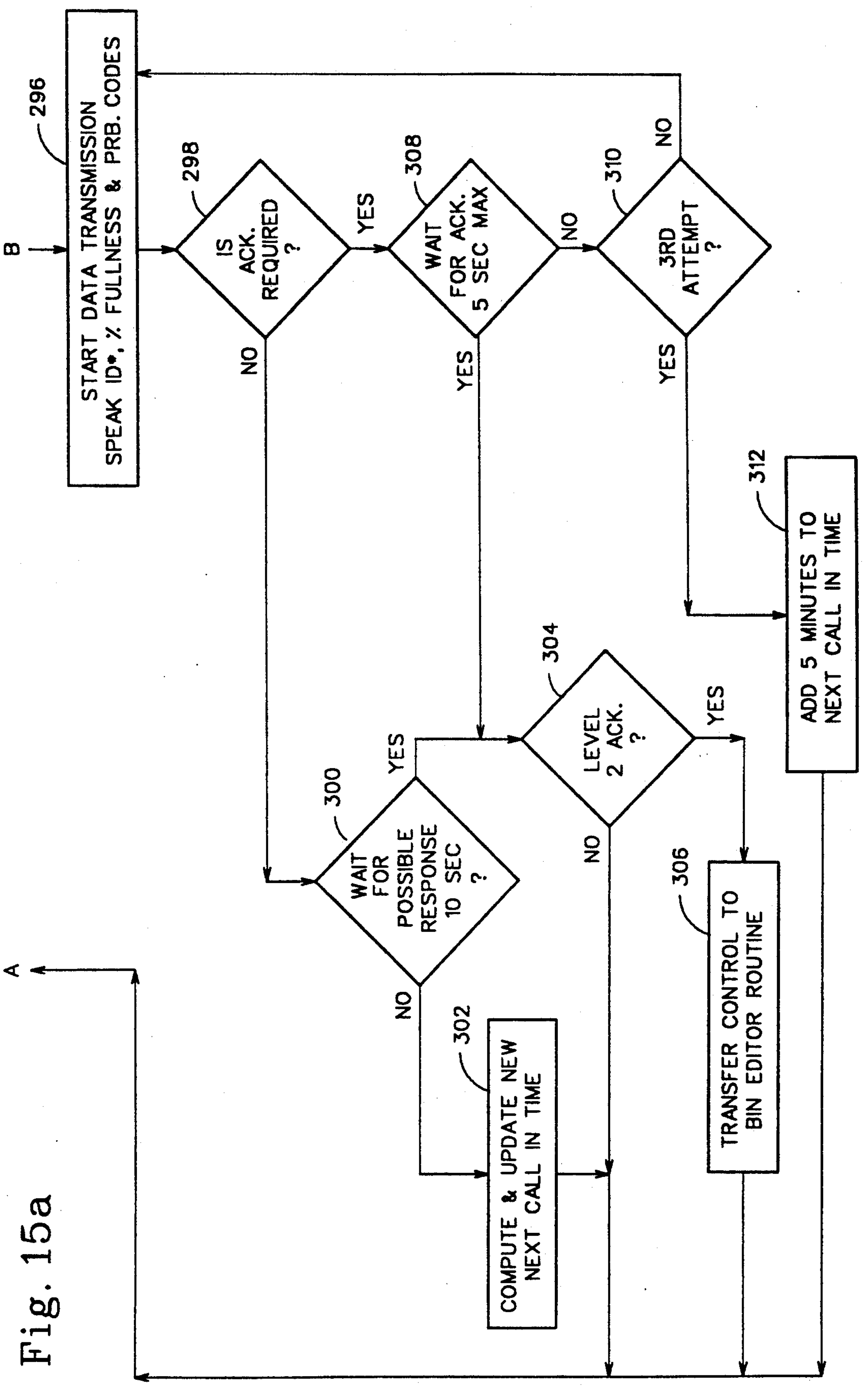

Should the telephone at the receiving station 58 answer, then a delay of 2 seconds occurs at 294 and then audio data transmission occurs at 296, as best shown in FIG. 15A. The audio data includes the unique identifier number for the particular compactor C, the percentage fullness, and any error messages. The "voice" of the audio signal is synthetically generated by the microprocessor 48 pursuant to current computer techniques.

An inquiry is made at 298 whether an acknowledgement has been received from the receiving station 58 that data transmission has occurred. If there is no acknowledgement, then a delay of 10 seconds occurs at 300 to wait for a possible response. If no response is received, such as could occur with a Level 2 acknowledgement, then the next call in time is updated at 302 pursuant to the call in schedule. If a response is received at 300, then an inquiry is made at 304 whether it is a Level 2 acknowledgement. If it is not a Level 2 acknowledgement, then the phone line is released at 284. Should a Level 2 acknowledgement be received, however, then control is transferred at 306 to the bin editor routine of FIG. 16.

Should acknowledgement of data transmission be required at 298, then an inquiry is made at 308 whether the acknowledgement has been received within five (5) seconds. If it is received, then the algorithm proceeds to 304 to inquire whether it is a Level 2 acknowledgment. If no acknowledgement is received at 308, however, then an inquiry is made at 310 whether this was the third attempt to receive the acknowledgement. If it is not the third attempt, then the algorithm proceeds to 296 to again start the data transmission. If it was the third attempt at acknowledgement, however, then 5 minutes are added to the next call in time at 312 and the phone is released at 284.

Figure 16:
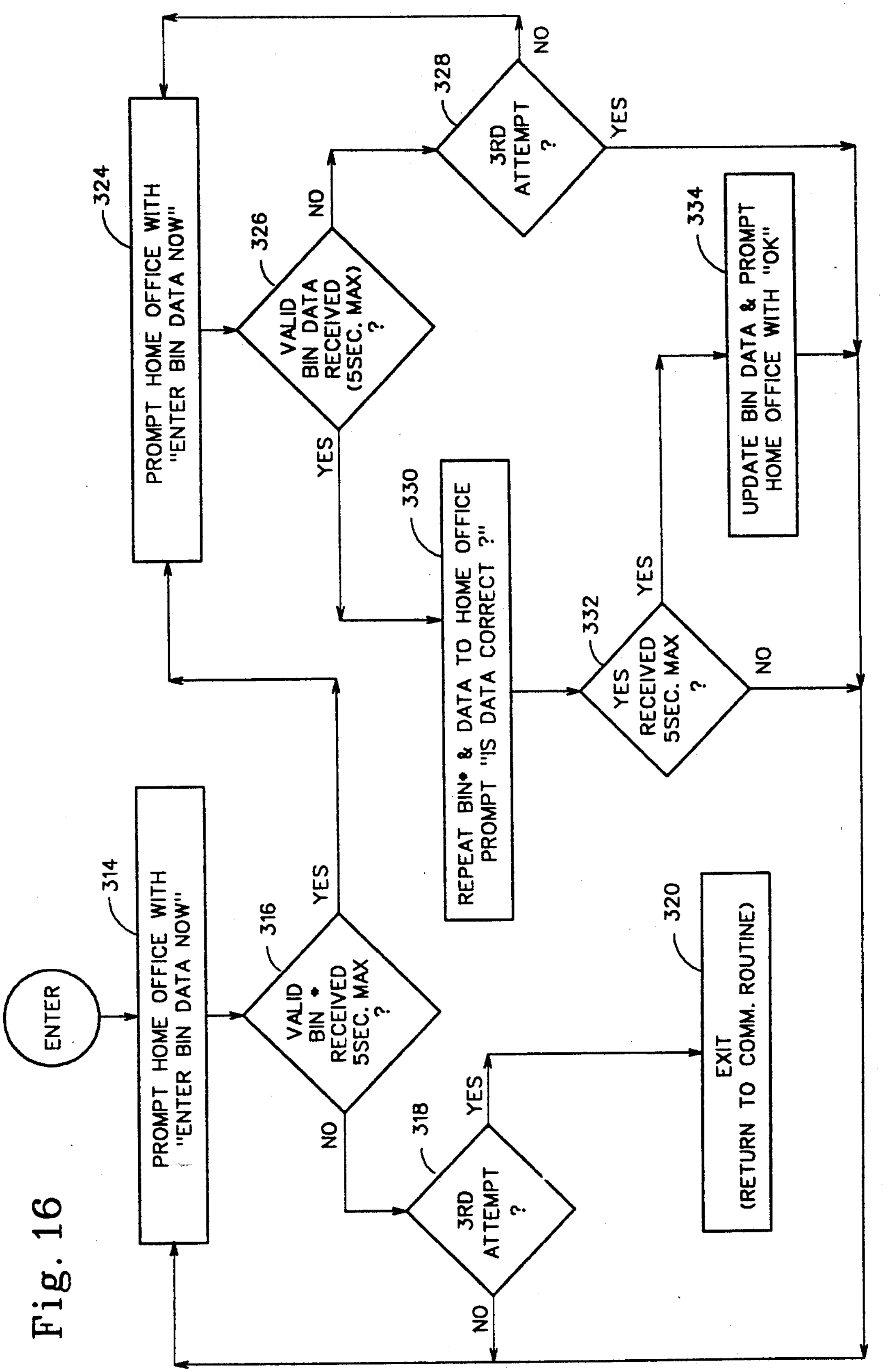
FIG. 16 is a flow chart for the bin editor phase of an audio communications algorithm of the invention.

Should control be transferred to the bin editor routine of FIG. 16 at 306, then there is an audio prompt given at 314 to "enter bin number now". An inquiry is then made at 316 into whether the bin number is valid. A bin number, as those skilled in the art understand, represents a specific memory location with the microprocessor 48. For example, there is a bin for the current time, day of week, call in schedule, etc., and the algorithm checks to make certain that the data received for a particular bin is consistent with what that bin should contain. A telephone number, for example, would not be consistent with the current time. If the bin number transmitted from the touch tone telephone at the receiving station 52 is not valid and three attempts have been made as determined at 318, then the algorithm returns at 320 to the entry point of the communications routine 322 of FIG. 15. If less than three attempts have been made to transmit a valid bin number, then the algorithm defaults to 314. The bin number at 314 represents the unique identification number for the particular compactor C, and is a security feature preventing the compactor from being reprogrammed without authorization.

If a valid bin number is received at 316, then an audio prompt is transmitted by the microprocessor 48 to the telephone at the receiving station 58 at step 324 requesting that additional data be entered. An inquiry is then made at 326 whether valid data has been received and if fewer than three attempts have been made as determined at 328, then the prompt is repeated. If three attempts have been made, however, to transmit valid data then the algorithm returns to 314 to make certain that the proper compactor is being accessed.

If valid data is determined at 326 to have been received, then the synthesized voice of the microprocessor 48 repeats the bin number and the received data, and prompts the user at the touch tone telephone station of the receiving station 58 to signal at 330 that the data is correct. If a ye is received at 332 within 5 seconds, then the memory in the microprocessor 48 is updated with this new information and the telephone at the receiving station 58 receives a prompt acknowledging same at 334. If a yes is not received at 332, then the algorithm again defaults to 314 in order to make certain that the proper compactor is being accessed.

While this invention has been described as having a preferred design, it is understood that it is capable of further modifications, uses and/or adaptations of the invention, following in general the principle of the invention and includes such departures from the present disclosure as come within known or customary practice in the art to which the invention pertains, and as may be applied to the central features hereinbefore set forth, and fall within the scope of the invention of the limits of the appended claims.

What we claim is:

1. A method of determining the fullness of a compactor having a reciprocating hydraulically operated ram and a container, comprising the steps of:
 a) setting a target number for the number of reciprocations of the ram required for the hydraulic pressure to achieve a predetermined value;
 b) monitoring each reciprocation of the ram and summing the total number thereof;
 c) monitoring the hydraulic pressure applied to the ram in order to cause each reciprocation;
 d) comparing the total number of reciprocations to the target number and calculating the percentage fullness of the container therefrom in the event the hydraulic pressure is less than the predetermined value; and
 e) displaying locally the percentage fullness of the container.

2. The method of claim 1, and including the step of:
 a) setting the target as a function of the number of reciprocations of the ram required for the pressure to achieve 50% of the maximum pressure.

3. The method of claim 2, including the step of:
 a) updating the target each time it has been determined that the predetermined value has been achieved.

4. The method of claim 1, including the step of:
 a) determining whether the container has been emptied after the predetermined value has been achieved.

5. The method of claim 4, including the step of:
 a) setting the target as a function of the average number of reciprocations of the ram required for the hydraulic pressure to achieve the predetermined value.

6. A method of determining the fullness of a compactor having a reciprocating hydraulic ram and a container, comprising the steps of:
 a) establishing a first target based upon the number of reciprocations of the ram required for the hydraulic pressure to achieve a predetermined value and a second target based upon the hydraulic pressure which must be applied to the ram to cause reciprocation thereof so that the container is filled;
 b) determining each reciprocation of the ram and summing the total number of reciprocations and monitoring the hydraulic pressure applied to the ram in order to cause each reciprocation;
 c) calculating the percentage fullness of the container based upon the total number of reciprocations in the event the predetermined value has not been achieved and calculating the percentage fullness based upon the monitored hydraulic pressure and the second target in the event the predetermined value has at least been achieved; and
 d) displaying locally the percentage fullness of the container.

7. The method of claim 6, including the step of:
 a) updating the first target in response to the number of reciprocations of the ram required for the predetermined value to be achieved.

8. The method of claim 6, including the step of:
 a) displaying that the container is empty when the monitored hydraulic pressure for a preselected number of reciprocations is less than the predetermined value after the predetermined value has at least been achieved.

9. The method of claim 8, including the step of:
 a) establishing the preselected number of reciprocations at three.

10. The method of claim 6, including the step of:
 a) monitoring the current hydraulic pressure by calculating an instantaneous pressure in the event the monitored current pressure exceeds a, previously monitored pressure by more than a preselected amount.

11. The method of claim 10, including the step of:
 a) limiting the amount by which the monitored instantaneous pressure may increase to no more than 3%.

12. The method of claim 10, including the step of:
 a) limiting the instantaneous pressure of one reciprocation to no more than a preselected increase in the pressure of the immediately precedent reciprocation.

13. A method of claim 6, and including the step of:
 a) setting the first target based upon the number of reciprocations of the ram required for the hydraulic pressure to achieve 50% of the maximum hydraulic pressure.

14. The method of claim 6, and including the step of:
 a) setting the first target based upon the number of reciprocations required for the second target to be achieved.

15. The method of claim 14, including the step of:
 a) establishing the preselected pressure at 1000 psi.

16. The method of claim 6, including the step of:
 a) storing in a microprocessor memory the total number of ram reciprocations and the percentage fullness.

17. The method of claim 16, including the step of:
 a) periodically transmitting to a receiving station the total number of reciprocations and the percentage fullness.

18. The method of claim 17, including the step of:
 a) transmitting the total number of reciprocations and the percentage fullness in audio form.

19. The method of claim 6, including the step of:
 a) transmitting the percentage fullness to a receiving station after the calculated percentage fullness has achieved a preselected amount.

20. The method of claim 19, including the step of:
 a) transmitting the percent fullness in audio form.

21. The method of determining if a compactor having an hydraulic ram and a container has been emptied, comprising the steps of:
 a) establishing an hydraulic pressure indicative of the container having achieved a preselected degree of fullness and establishing an hydraulic pressure indicative of the container being empty;
 b) monitoring the hydraulic pressure required to cause reciprocation of the ram;
 c) indicating when the monitored hydraulic pressure establishes that the preselected fullness of the container has been achieved; and
 d) indicating that the container has been emptied after the indication has been made that the preselected fullness has been achieved and the monitored hydraulic pressure for a preselected number of reciprocations is substantially equal to the hydraulic pressure indicative of the container being empty.

22. The method of claim 21, including the step of:

a) utilizing 50% of the maximum hydraulic pressure as an indicator for the preselected degree of fullness.

23. The method of claim 22, including the step of:

a) setting the preselected number of reciprocations at no less than three.

24. The method of claim 21, including the step of:

a) setting the preselected number of reciprocation at no less than three.

25. The method of claim 21, including the step of:

a) displaying locally the percent fullness of the container.

26. The method of determining the percentage fullness of a plurality of compactors, each compactor having a reciprocating ram and a container and means for monitoring the fullness of the container, comprising the steps of:

a) determining the percentage fullness of each container by counting the number of reciprocations of the associated ram and monitoring the hydraulic pressure applied to the ram during each reciprocation;

b) locally indicating the percentage fullness of the container upon the completion of each reciprocation; and c) transmitting to a remote receiving station for each compactor the percentage fullness and a unique identifier for the associated compactor.

27. The method of claim 26, including the step of:

a) transmitting the percentage fullness and the unique identifier upon the percentage fullness having achieved a preselected level.

28. The method of claim 26, and including the step of:

a) periodically transmitting the percentage fullness and the unique identifier for each compactor.

29. The method of claim 26, and including the step of:

a) transmitting the percentage fullness and the unique identifier in audio form.

30. A fullness determining system, comprising:

a) a compactor including a reciprocal ram and an operably associated container into which material is transferred by said ram for compaction therein thereby;

b) a variable pressure drive means operably associated with said ram or causing reciprocation thereof;

c) a display operably associated with said compactor for displaying the percentage fullness of said container; and d) monitor means operably associated with said drive means for determining the percentage fullness of said container, said monitor means includes first means for determining the completion of a reciprocation by said ram, second means for monitoring the output of said drive means, third means for counting the reciprocations of said ram in response to said first means, fourth means for initially calculating the percentage fullness of said container based upon the value of said third means until a predetermined value has been achieved by said second means and for thereafter calculating the percentage fullness of said container based upon the value of said second means, and fifth means operably associated with said display for causing the calculated percentage fullness to be displayed.

31. A method of determining the fullness of a compactor having a reciprocating hydraulically operated ram and a container, comprising the steps of:

a) setting a target number for the number of reciprocations of the ram required for the hydraulic pressure to achieve a predetermined value;

b) monitoring each reciprocation of the ram and summing the total number thereof;

c) monitoring the hydraulic pressure applied to the ram in order to cause each reciprocation;

d) comparing the total number of reciprocations to the target number and calculating the percentage fullness of the container therefrom in the event the hydraulic pressure is less than the predetermined value; and e) indicating the fullness of the container.

* * * * *